(12) United States Patent
Nomura et al.

(10) Patent No.: US 10,407,552 B2
(45) Date of Patent: Sep. 10, 2019

(54) PRESS-MOLDED PRODUCT AND COMPOSITE MATERIAL

(71) Applicant: Teijin Limited, Osaka-Shi, Osaka (JP)

(72) Inventors: Akihisa Nomura, Osaka (JP); Katsuaki Yuasa, Osaka (JP); Guofei Hua, Osaka (JP)

(73) Assignee: Teijin Limited, Osaka-Shi, Osaka (JP)

( * ) Notice: Subject to any disclaimer, the term of this patent is extended or adjusted under 35 U.S.C. 154(b) by 0 days.

(21) Appl. No.: 15/571,429

(22) PCT Filed: Aug. 2, 2016

(86) PCT No.: PCT/JP2016/072697
§ 371 (c)(1),
(2) Date: Nov. 2, 2017

(87) PCT Pub. No.: WO2017/056693
PCT Pub. Date: Apr. 6, 2017

(65) Prior Publication Data
US 2018/0134856 A1 May 17, 2018

(30) Foreign Application Priority Data
Sep. 30, 2015 (JP) .................................. 2015-193694

(51) Int. Cl.
*C08J 5/04* (2006.01)
*C08J 5/06* (2006.01)
(Continued)

(52) U.S. Cl.
CPC ................. *C08J 5/042* (2013.01); *C08J 5/04* (2013.01); *C08J 5/06* (2013.01); *C08K 7/02* (2013.01);
(Continued)

(58) Field of Classification Search
CPC .................................. C08J 5/042; C08K 7/02
See application file for complete search history.

(56) References Cited

U.S. PATENT DOCUMENTS

| | | | | |
|---|---|---|---|---|
| 7,182,886 | B2 * | 2/2007 | Elkovitch | .............. B82Y 30/00 252/500 |
| 2005/0038159 | A1 | 2/2005 | Elkovitch et al. | |

(Continued)

FOREIGN PATENT DOCUMENTS

| | | |
|---|---|---|
| CN | 1867635 A | 11/2006 |
| CN | 101194324 A | 6/2008 |

(Continued)

OTHER PUBLICATIONS

Nov. 8, 2016—International Search Report—Intl App PCT/JP2016/072697.

(Continued)

*Primary Examiner* — Jennifer A Steele
(74) *Attorney, Agent, or Firm* — Banner & Witcoff, Ltd.

(57) ABSTRACT

A press-molded product includes: carbon fibers having a weight average fiber length of 1 mm or more; a polyamide-based resin (X); and a polyarylene ether-based resin (Y). The carbon fibers include carbon fiber bundles. The polyamide-based resin (X) and the polyarylene ether-based resin (Y) form a sea-island structure inside and outside the carbon fiber bundles. In the sea-island structure, one of the polyamide-based resin (X) and the polyarylene ether-based resin (Y) forms a sea phase and the other forms an island phase having a particle diameter Dr of 0.05 μm or more and less than 50 μm.

29 Claims, 3 Drawing Sheets

(51) Int. Cl.
*C08K 7/02* (2006.01)
*C08L 77/00* (2006.01)
*C08L 71/12* (2006.01)
*C08K 7/06* (2006.01)

(52) U.S. Cl.
CPC ............... *C08K 7/06* (2013.01); *C08L 71/12* (2013.01); *C08L 77/00* (2013.01); *C08J 2371/10* (2013.01); *C08J 2371/12* (2013.01); *C08J 2377/02* (2013.01); *C08J 2377/06* (2013.01); *C08J 2425/06* (2013.01); *C08J 2471/10* (2013.01); *C08J 2471/12* (2013.01); *C08J 2477/02* (2013.01); *C08J 2477/06* (2013.01)

(56) References Cited

U.S. PATENT DOCUMENTS

| | | |
|---|---|---|
| 2005/0038171 A1 | 2/2005 | Elkovitch et al. |
| 2005/0038191 A1 | 2/2005 | Elkovitch et al. |
| 2005/0038203 A1 | 2/2005 | Elkovitch et al. |
| 2006/0205872 A1 | 9/2006 | Elkovitch |
| 2006/0280938 A1* | 12/2006 | Atkinson ............... C08K 7/06 428/364 |
| 2007/0238832 A1* | 10/2007 | Borade ................. C08J 3/226 525/66 |
| 2009/0004453 A1* | 1/2009 | Murai ................... B29C 43/003 428/299.1 |
| 2009/0004460 A1* | 1/2009 | Gruber ................. B82Y 30/00 428/323 |
| 2012/0028047 A1 | 2/2012 | Imai et al. |
| 2013/0344282 A1* | 12/2013 | Yagi ..................... B29C 70/10 428/113 |
| 2014/0004308 A1* | 1/2014 | Taniguchi ............... C08J 5/04 428/156 |
| 2014/0077412 A1 | 3/2014 | Taniguchi et al. |
| 2014/0148072 A1* | 5/2014 | Nagakura ............. B29C 43/003 442/60 |
| 2015/0064408 A1 | 3/2015 | Taniguchi et al. |
| 2015/0219370 A1 | 8/2015 | Kato |

FOREIGN PATENT DOCUMENTS

| | | | |
|---|---|---|---|
| EP | 0559485 A1 | 9/1993 | |
| EP | 2410021 A1 | 1/2012 | |
| JP | 62273254 A * | 11/1987 | ............... C08L 71/12 |
| JP | H05-306369 A | 11/1993 | |
| JP | 2002-088259 A | 3/2002 | |
| JP | 2002-179924 A | 6/2002 | |
| JP | 2010-222578 A | 10/2010 | |
| JP | 2011-012206 A1 | 1/2011 | |
| WO | 2008123449 A1 | 10/2008 | |
| WO | 2010-107022 A1 | 9/2010 | |
| WO | 2012-165418 A1 | 12/2012 | |

OTHER PUBLICATIONS

Nov. 8, 2016—(WO) Written Opinion of ISA—Intl App PCT/JP2016/072697.
Aug. 31, 2018—(EP) Office Action—App 16850870.3.
Dec. 28, 2018—(CN) Office Action—App 201680026043.4—computer generated translation.
Jan. 28, 2019—(EP) Office Action—App 16850870.3.

* cited by examiner

PRESS-MOLDED PRODUCT AND COMPOSITE MATERIAL

CROSS REFERENCE TO RELATED APPLICATIONS

This is a U.S. National Phase Application under 35 U.S.C. § 371 of International Application No. PCT/JP2016/072697, filed Aug. 2, 2016, which claims priority to Japanese Application No. 2015-193694, filed Sep. 30, 2015, the entire contents of each of which are incorporated herein by reference.

TECHNICAL FIELD

The present invention relates to a press-molded product having excellent dimensional stability and mechanical strength, and a composite material.

BACKGROUND ART

In recent years, in the mechanical field, so-called fiber-reinforced resin molded products containing a thermoplastic resin and carbon fibers have received attention. These fiber-reinforced resin molded products are excellent in mechanical properties due to the carbon fibers dispersed in the thermoplastic resin and thus have received attention as structural members for automobiles and the like.

Patent Document 1 discloses a fiber-reinforced resin molded product using a thermoplastic resin, and discloses a method of manufacturing a press-molded product by cold-pressing a thermoplastic resin containing a polyamide 6 resin and carbon fibers.

On the other hand, as the thermoplastic resin contained in the fiber-reinforced resin molded product, a technique that uses a polymer alloy component, for example, a polymer alloy component of a polyamide-based resin and a polyarylene ether-based resin is known. A polyamide resin is a thermoplastic resin having features such as excellent mechanical strength, solvent resistance, and processability. In addition, a polyarylene ether-based resin is a thermoplastic resin which is excellent in various properties such as mechanical properties, heat resistance, cold resistance, and dimensional stability.

As the fiber-reinforced resin molded product using such thermoplastic resins, for example, Patent Document 2 proposes a technique for improving rigidity by adding an inorganic filler to an alloy of polyamide and polyphenylene ether for an exterior material. Likewise, Patent Document 3 proposes a thermoplastic resin which consists of a polyphenylene ether resin, a polyamide resin, and inorganic fibers and is excellent in fluidity, rigidity, and strength.

CITATION LIST

Patent Document

[Patent Document 1] International Publication No. 2012/165418
[Patent Document 2] JP-A-2010-222578
[Patent Document 3] JP-A-5-306369

SUMMARY OF INVENTION

Problem to be Solved by Invention

However, although the press-molded product described in Patent Document 1 is excellent in mechanical properties at room temperature and room humidity, the physical properties thereof in high temperature and high humidity environments are not yet sufficient, and there is a demand for a press-molded product that can be used in more severe environments depending on the application. Furthermore, a molding material in the related art, which uses a polyamide-based resin, has excellent fluidity but is still insufficient from the viewpoint of formability. Therefore, it is necessary to achieve both the mechanical properties of a press-molded product and the formability of a composite material in high temperature and high humidity environments.

The press-molded product described in Patent Document 1 uses the composite material using polyamide 6 (nylon 6) as the thermoplastic resin. Therefore, when the composite material is cold-pressed and cooled using the polyamide 6, volume shrinkage occurs and the shape of the carbon fibers contained in the composite material is exposed to the surface, which is a problem in outer appearance.

On the other hand, regarding the thermoplastic resins described in Patent Documents 2 and 3, the resin compositions are examined so as to withstand use in high temperature and high humidity environments. However, the examination of the resin compositions is limited only to the injection molding applications, and in a case where the resin compositions are molded into injection-molded products, the weight average fiber length of the carbon fibers is too short to ensure mechanical properties. Furthermore, regarding the shear force in a kneading step, when a polyamide-based resin single component and two thermoplastic resin components (the polyamide-based resin and the polyarylene ether-based resin) are compared to each other, higher shear force is required in the case where the two thermoplastic resin components (the polyamide-based resin and the polyarylene ether-based resin) are used. Therefore, in the case where the typical two thermoplastic resin components (the polyamide-based resin and the polyarylene ether-based resin) are used, an excessive molding pressure is required for injection molding. In addition, the molded product based on the polymer alloy using the polyamide-based resin and the polyarylene ether-based resin has lower impact resistance than that of a molded product using the polyamide-based resin single component.

Therefore, an object of the present invention is to provide a press-molded product containing carbon fibers, which satisfies all of (i) high mechanical properties of a press-molded product in high temperature and high humidity environments, (ii) good formability of a composite material, (iii) excellent surface appearance of a press-molded product, and (iv) impact strength at the same degree as that of a press-molded product using only a polyamide-based resin as a matrix, and a composite material used therein.

Solution to Problem

In order to solve the above problems, the present invention provides the following means.

<1>
A press-molded product including:
carbon fibers having a weight average fiber length of 1 mm or more;
a polyamide-based resin (X); and
a polyarylene ether-based resin (Y),
in which the carbon fibers include carbon fiber bundles, the polyamide-based resin (X) and the polyarylene ether-based resin (Y) form a sea-island structure inside and outside the carbon fiber bundles in which one of the polyamide-based resin (X) and the polyarylene ether-based resin (Y) forms a sea phase and the other forms an island phase having a particle diameter Dr of 0.05 µm or more and less than 50 µm.

<2>

The press-molded product according to <1>, in which the polyamide-based resin (X) forms the sea phase and the polyarylene ether-based resin (Y) forms the island phase.

<3>

The press-molded product according to <1> or <2>, in which, with respect to 100 parts by mass of the polyamide-based resin (X), 20 parts by mass or more and 300 parts by mass or less of the polyarylene ether-based resin (Y) is contained.

<4>

The press-molded product according to any one of <1> to <3>, in which, with respect to 100 parts by mass of the polyarylene ether-based resin (Y), 0.05 parts by mass or more and 10 parts by mass or less of a compatibilizer is contained.

<5>

The press-molded product according to any one of <1> to <4>, further including: a thermoplastic resin (Z), in which a viscosity at 230° C. in dynamic viscoelasticity measurement at a rate of temperature decrease of 5° C./min, 270° C. to 200° C., and 10 rad/sec is 10,000 to 60,000 Pa·sec.

<6>

The press-molded product according to <5>, in which the viscosity according to <5> is 0.6 $\eta_x$ or more and 1.4 $\eta_x$ or less, wherein $\eta_x$ represents a viscosity value of the press-molded product generated by replacing the polyarylene ether-based resin (Y) and the thermoplastic resin (Z) with the polyamide-based resin (X).

<7>

The press-molded product according to <5> or <6>, including 20 parts by mass or more and 300 parts by mass or less of the polyarylene ether-based resin (Y); and 1 part by mass or more and 300 parts by mass or less of the thermoplastic resin (Z), with respect to 100 parts by mass of the polyamide-based resin (X).

<8>

The press-molded product according to any one of <5> to <7>, in which the thermoplastic resin (Z) is a polystyrene-based resin.

<9>

The press-molded product according to any one of <5> to <8>, in which the thermoplastic resin (Z) and the polyarylene ether-based resin (Y) form a mixed phase.

<10>

The press-molded product according to any one of <1> to <9>, in which the carbon fibers have a volume fraction of 3 vol % or more and 60 vol % or less.

<11>

The press-molded product according to any one of <1> to <10>, in which the carbon fibers are randomly dispersed in two-dimensions in an in-plane direction, and a ratio obtained by dividing a large one of values of tensile moduli respectively measured in an arbitrary direction of the molded product and the direction orthogonal to the arbitrary direction by the smaller one of the values is 2 or less.

<12>

The press-molded product according to any one of <1> to <11>, in which a distance L between carbon fiber single fibers which is shorter than the particle diameter Dr of the island phase is present inside the carbon fiber bundle in a cross-section view of the press-molded product.

<13>

The press-molded product according to <12>, in which at least one island phase is in contact with the carbon fibers inside the carbon fiber bundle.

<14>

The press-molded product according to any one of <1> to <13>, in which the carbon fiber bundle includes a critical number of single fibers defined in Expression (1) or more.

$$\text{Critical number of single fibers}=600/Df \quad (1)$$

Here, Df is an average fiber diameter (µm) of the carbon fibers.

<15>

A composite material including:
carbon fibers having a weight average fiber length of 1 mm or more;
a polyamide-based resin (X); and
a polyarylene ether-based resin (Y),
in which the carbon fibers include carbon fiber bundles,
the polyamide-based resin (X) and the polyarylene ether-based resin (Y) form a sea-island structure inside and outside the carbon fiber bundles in which one of the polyamide-based resin (X) and the polyarylene ether-based resin (Y) forms a sea phase and the other forms an island phase having a particle diameter of 0.05 µm or more and less than 50 µm.

<16>

The composite material according to <15>, in which the polyamide-based resin (X) forms the sea phase and the polyarylene ether-based resin (Y) forms the island phase.

<17>

The composite material according to <15> or <16>, including: 20 parts by mass or more and 300 parts by mass or less of the polyarylene ether-based resin (Y) with respect to 100 parts by mass of the polyamide-based resin (X).

<18>

The composite material according to any one of <15> to <17>, further including: 0.05 parts by mass or more and 10 parts by mass or less of a compatibilizer with respect to 100 parts by mass of the polyarylene ether-based resin (Y).

<19>

The composite material according to any one of <15> to <18>, further including: a thermoplastic resin (Z), and having a viscosity η at 230° C. in dynamic viscoelasticity measurement at a rate of temperature decrease of 5° C./min, decreasing from 270° C. to 200° C., and 10 rad/sec is 10,000 to 60,000 Pa·sec.

<20>

The composite material according to <19>, in which the viscosity η according to <19> is 0.6 $\eta_x$ or more and 1.4 $\eta_x$ or less, wherein $\eta_x$ represents a viscosity value of a composite material generated by replacing the polyarylene ether-based resin (Y) and the thermoplastic resin (Z) with the polyamide-based resin (X).

<21>

The composite material according to <19> or <20>, including: 20 parts by mass or more and 300 parts by mass or less of the polyarylene ether-based resin (Y); and 1 part by mass or more and 300 parts by mass or less of the thermoplastic resin (Z), with respect to 100 parts by mass of the polyamide-based resin (X).

<22>

The composite material according to any one of <19> to <21>, in which the thermoplastic resin (Z) is a polystyrene-based resin.

<23>

The composite material according to any one of <19> to <22>, in which the thermoplastic resin (Z) and the polyarylene ether-based resin (Y) form a mixed phase.

<24>

The composite material according to any one of <15> to <23>, in which a volume fraction of the carbon fibers is 3 vol % or more and 60 vol % or less.

<25>

The composite material according to any one of <15> to <24>, in which a distance L between carbon fiber single fibers which is shorter than the particle diameter Dr of the island phase is present inside the carbon fiber bundle in a cross-section view of the composite material.

<26>

The composite material according to any one of <15> to <25>, in which at least one island phase is in contact with the carbon fibers inside the carbon fiber bundle.

<27>

The composite material according to any one of <15> to <26>, in which the carbon fiber bundle includes a critical number of single fibers defined in Expression (1) or more.

$$\text{Critical number of single fibers} = 600/Df \quad (1)$$

Here, Df is an average fiber diameter (μm) of the carbon fibers.

Advantageous Effects of Invention

The press-molded product in the present invention has (i) high mechanical properties of a press-molded product in high temperature and high humidity environments, (ii) good formability of a composite material, (iii) excellent surface appearance of a press-molded product, and (iv) impact strength at the same degree as that of a press-molded product using only a polyamide-based resin as a matrix.

DESCRIPTION OF EMBODIMENTS

[Carbon Fibers]

Figure 1:
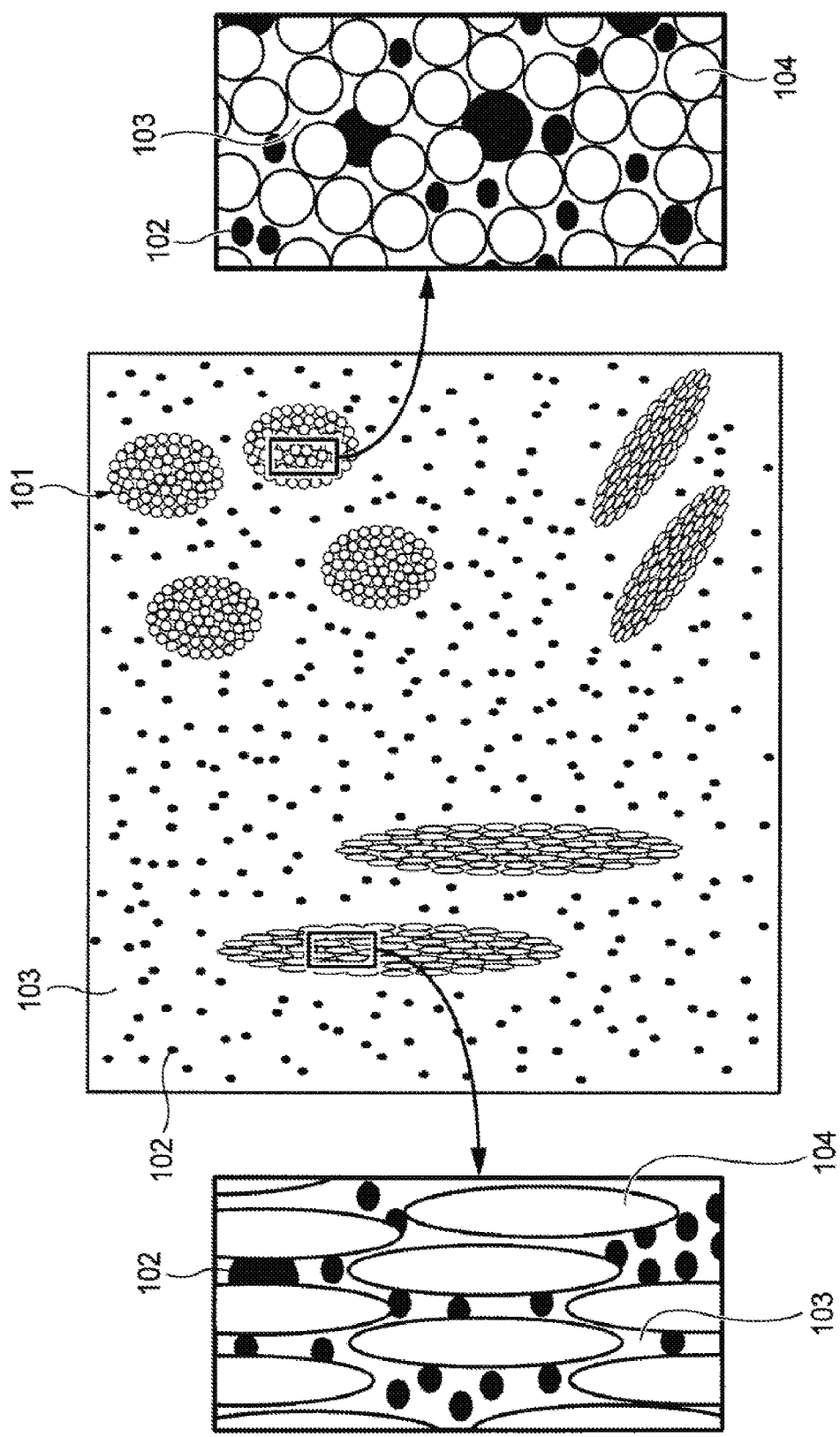
FIG. 1 is a schematic view of a sea-island structure when an example of a press-molded product of the present invention is observed in a cross-section.

As carbon fibers used in the present invention, in general, polyacrylonitrile (PAN)-based carbon fibers, petroleum and coal pitch-based carbon fibers, rayon-based carbon fibers, cellulose-based carbon fibers, lignin-based carbon fibers, phenol-based carbon fibers, vapor grown carbon fibers, and the like are known, and any of these carbon fibers may be suitably used in the present invention.

Among these, polyacrylonitrile (PAN)-based carbon fibers are preferably used in the present invention from the viewpoint of excellent tensile strength. In a case where the PAN-based carbon fibers are used as the carbon fibers, the tensile modulus thereof is preferably in a range of 100 GPa to 600 GPa, more preferably in a range of 200 GPa to 500 GPa, and even more preferably in a range of 230 GPa to 450 GPa. In addition, the tensile strength thereof is preferably in a range of 2000 MPa to 10000 MPa, and more preferably in a range of 3000 MPa to 8000 MPa.

(Sizing Agent)

The carbon fibers used in the present invention may have a sizing agent adhered to the surface. In a case of using the carbon fibers to which the sizing agent is adhered, the kind of the sizing agent may be appropriately selected according to the kinds of the carbon fibers and a thermoplastic resin, and is not particularly limited.

As a preferable sizing agent for manufacturing a composite material and a press-molded product in the present invention, for example, ternary copolymer polyamide particles described in International Publication No. 2013/133421 are preferably used. For example, when nylon 6/nylon 66/nylon 12 (weight ratio: 45/15/40 wt %), which is a sizing agent described in Example 1 of the publication, is used, a sea-island structure in which one of a polyamide-based resin (X) and a polyarylene ether-based resin (Y) forms a sea phase and the other forms an island phase can be easily formed up to the inside of a bundle of the carbon fibers.

(Fiber Length)

The weight average fiber length of the carbon fibers used in the present invention is 1 mm or more, and preferably 1 mm or more and 100 mm or less. The weight average fiber length of the carbon fibers is more preferably 3 mm or more and 80 mm or less, and even more preferably 5 mm or more and 60 mm or less.

When the weight average fiber length is 100 mm or less, the fluidity of the composite material does not decrease, and a molded product can easily obtain a desired shape during press molding. On the other hand, in a case where the weight average fiber length is 1 mm or more, the mechanical strength of the molded product does not decrease.

Typically, in an injection-molded product forming good appearance, the weight average fiber length of carbon fibers is less than 1 mm In the present invention, carbon fibers having different fiber lengths may be used in combination. In other words, the weight average fiber length of the carbon fibers used in the present invention may have a single peak or may have a plurality of peaks.

For example, the average fiber length of the carbon fibers can be obtained on the basis of Expression (a) by measuring the fiber lengths of 100 fibers randomly extracted from the molded product up to 1 mm unit using a caliper or the like.

Assuming that the fiber length of each carbon fiber is Li and the number of measured fibers is j, the number average fiber length (Ln) and the weight average fiber length (Lw) are obtained by Expressions (a) and (b).

$$Ln = \Sigma Li/j \quad \text{Expression (a)}$$

$$Lw = (\Sigma Li^2)/(\Sigma Li) \quad \text{Expression (b)}$$

In a case where the fiber length is constant, the number average fiber length and the weight average fiber length have the same value.

Extraction of the carbon fibers from the molded product can be achieved, for example, by performing a heating treatment on the molded product at about 500° C. for about 1 hour and removing the resin in a furnace.

(Fiber Length)

The fiber diameter of the carbon fibers used in the present invention may be appropriately determined depending on the kind of the carbon fibers, and is not particularly limited. The average fiber diameter is typically preferably in a range of 3 μm to 50 μm, more preferably in a range of 4 μm to 12

μm, and even more preferably in a range of 5 μm to 8 μm. Here, the average fiber diameter refers to the diameter of a single fiber of the carbon fibers. Therefore, in a case where the carbon fibers are in the form of a fiber bundle, the average fiber length refers not to the diameter of the fiber bundle but to the diameter of the carbon fiber (single fiber) constituting the fiber bundle. The average fiber diameter of the carbon fibers can be measured, for example, by the method described in JIS R-7607:2000.

(Carbon Fiber Volume Fraction)

In the present invention, the volume fraction of the carbon fibers ("carbon fiber volume fraction", hereinafter, simply referred to as "Vf") in the molded product, which is defined by Expression (c), is preferably 3 vol % or more and 60 vol % or less. More preferably, the carbon fiber volume fraction is 10 vol % or more and 60 vol % or less, more preferably 10 vol % or more and 50 vol % or less, even more preferably 20 vol % or more and 50 vol % or less, and most preferably 25 vol % or more and 45 vol % or less.

$$\text{Carbon fibers volume fraction (Vf)}=100\times\text{carbon fiber volume/(carbon fiber volume+thermoplastic resin volume)} \qquad \text{Expression (c)}$$

In a case where the carbon fiber volume fraction (Vf) in the molded product is 3 vol % or more, desired mechanical properties are easily obtained. On the other hand, in a case where the carbon fiber volume fraction (Vf) in the molded product does not exceed 60 vol %, the fluidity at the time of use in press molding is good and the molded product easily obtain a desired shape.

(Fiber Areal Weight)

The fiber areal weight of the carbon fibers in the molded product is not particularly limited, and is typically set to 25 g/m² or more to 10000 g/m² or less.

(Fiber Form)

In the present invention, the carbon fibers included in the press-molded product includes carbon fiber bundles.

The carbon fibers used in the present invention may include fiber bundles, and may have a mixture of both single fibers and fiber bundles. The number of single fibers constituting each fiber bundle may be substantially uniform for the individual fiber bundles and may be different. The number of single fibers constituting each fiber bundle used in the present invention is not particularly limited, and is typically set to be in a range of several to 100,000.

In general, the carbon fibers as a raw material are in the form of a fiber bundle which is a collection of thousands to tens of thousands of filaments. When the carbon fibers are used as they are, the entanglement of the fiber bundles becomes locally thick, and there may be a case where it is difficult to obtain a thin-walled molded product. Therefore, in the case of using the carbon fibers, the fiber bundles are typically extended for use.

The carbon fibers in the present invention preferably include carbon fiber bundles consisting of a specific number or more of carbon fibers by controlling the degree of opening of the fiber bundles, and more preferably include less than a specific number of carbon fibers (single fibers) or carbon fiber bundles.

That is, although there is no problem as long as the carbon fiber bundle is a bundle including 10 or more single carbon fibers, a carbon fiber bundle (A) consisting of a critical number or more of single fibers defined by Expression (1) is more preferable.

$$\text{Critical number of single fibers}=600/Df \qquad (1)$$

Here, Df is the average fiber diameter (μm) of the carbon fibers.

That is, when the critical number of single fibers in Expression (1) is calculated, Df uses the value in a case where the unit is μm.

More preferably, the carbon fibers in the present invention include the carbon fiber bundles (A) consisting of the critical number of single fibers defined in Expression (1) and the other carbon fibers extended, that is, carbon fibers in the form of single fibers or fiber bundles consisting less than the critical number of single fibers.

Furthermore, in the present invention, the proportion of the carbon fiber bundles (A) with respect to the total amount of the carbon fibers in the molded product is preferably more than 0 vol % and less than 99 vol %, more preferably 20 vol % or more and less than 99 vol %, even more preferably 30 vol % or more and less than 95 vol %, and most preferably 50 vol % or more and less than 90 vol %. This is because, by allowing the carbon fiber bundles consisting a specific number or more carbon fibers to coexist with the other carbon fibers or carbon fiber bundles which are extended, it becomes possible to increase the amount of the carbon fibers present in the molded product, that is, the fiber volume fraction (Vf).

In the present invention, the average number (N) of fibers in the carbon fiber bundles (A) can be appropriately determined in a range in which the object of the present invention is not impaired, and is not particularly limited.

N is typically set to be in a range of 1<N<12000, but more preferably satisfies Expression (2).

$$6\times10^3/Df^2<N<6\times10^5/Df^2 \qquad (2)$$

Here, Df is the average fiber diameter (μm) of the carbon fibers.

That is, Df in expression (2) uses the value in a case where the unit is μm.

(Two-Dimensional Random)

In the carbon fibers in the present invention, it is preferable that the major axis directions of the fibers are randomly dispersed in two-dimensions in the in-plane directions of the molded product.

Here, being dispersed at two-dimensional random means that carbon fibers are oriented not in a specific direction such as one direction in the in-plane directions of the molded product but disorderedly and thus are arranged in a sheet plane without exhibiting specific directivity as a whole. The molded product obtained by using discontinuous fibers dispersed at two-dimensional random is a substantially isotropic molded product having no in-plane anisotropy.

Furthermore, since the form of the carbon fibers is substantially maintained before and after the press molding, it is preferable that the carbon fibers contained in the composite material are also dispersed at two-dimensional random in the in-plane directions of the molded product.

In addition, the in-plane directions of the molded product are directions orthogonal to the plate thickness direction of the molded product, which mean arbitrary directions in the same plane (one of parallel planes which are orthogonal to the plate thickness direction) while each of the longitudinal direction or the width direction indicates a fixed direction.

The degree of two-dimensional random orientation is evaluated by obtaining the ratio between tensile moduli in two orthogonal directions. When the (Eδ) ratio obtained by dividing a larger one of the values of the tensile moduli respectively measured in an arbitrary direction of the molded product and the direction orthogonal to the arbitrary direction by a smaller one of the values is 2 or less, and more preferably 1.3 or less, it can be evaluated that the carbon fibers are randomly dispersed in two-dimensions.

[Polyamide-Based Resin (X)]

The polyamide-based resin (X) in the present invention is not particularly limited, and for example, polyamide-based resins such as polyamide 6, polyamide 11, polyamide 12, polyamide 46, polyamide 56, polyamide 410, polyamide 510, polyamide 66, polyamide 610, polyamide 612, polyamide 1010, polyamide 4T, polyamide 5T, polyamide SI, polyamide 6T, polyamide 6I, a polyamide 4,6 copolymer, polyamide 6.12, polyamide 9T, polyamide MXD6, a homopolymer such as a polyamide (polyamide PACMI) formed by polymerizing isophthalic acid and bis(3-methyl-4-aminocyclohexyl)methane, and a copolymer or mixture thereof may be used.

Among these polyamides, polyamide 6, polyamide 66, polyamide 610, and polyamide 6T are preferably used, and polyamide 6 or polyamide 66 is more preferably used.

The polyamide-based resin may be of only one kind or two or more kinds. As an embodiment in which two or more kinds of polyamide-based resins are used in combination, for example, an embodiment in which polyamide-based resins having different softening points or melting points are used in combination, an embodiment in which polyamide-based resins having different average molecular weights are used in combination, and the like may be employed. However, the embodiment is not limited thereto.

In addition, a polyamide derivative in which a functional group reactive with a carboxylic acid is introduced into a terminal group or a side chain of a polyamide resin may also be used.

In this specification, the polyamide-based resin may be referred to as a PA resin in some cases.

[Polyarylene Ether-Based Resin]

A method of manufacturing the polyarylene ether-based resin (Y) in the present invention is well known in the related art, and a large number of polyarylene ether-based resins can be commercially acquired.

The polyarylene ether resin has repeating units having the following formula:

[Chem 1]

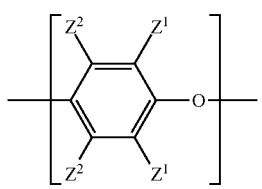

(in the formula, $Z^1$'s each independently represent a halogen, a unsubstituted or substituted C1 to C12 hydrocarbyl (here, the hydrocarbyl group is not a tert-hydrocarbyl), a C1 to C12 hydrocarbylthio, a C1 to C12 hydrocarbyloxy, or a C2 to C12 halohydrocarbyloxy, where the halogen and oxygen atoms are separated by at least two carbon atoms; and $Z^2$'s each independently represent hydrogen, a halogen, a unsubstituted or substituted C1 to C12 hydrocarbyl (here, the hydrocarbyl group is not a tert-hydrocarbyl), a C1 to C12 hydrocarbylthio, a C1 to C12 hydrocarbyloxy, or a C2 to C12 halohydrocarbyloxy, where the halogen and oxygen atoms are separated by at least two carbon atoms).

The polyarylene ether-based resin is not particularly limited, but may be a polyarylene ether resin or a modified polyarylene ether resin.

Among these polyarylene ether-based resins, a polyphenylene ether resin or a modified polyphenylene ether resin is particularly preferable.

[Polyphenylene Ether Resin]

In a case where the polyphenylene ether resin is used as the polyarylene ether-based resin, examples thereof include poly(2,6-dimethyl-1,4-phenylene ether), poly(2-methyl-6-ethyl-1,4-phenylene ether), poly(2-methyl-6-phenyl-1,4-phenylene ether), and poly(2,6-dichloro-1,4-phenylene ether) although there is no particular limitation.

Furthermore, although a copolymer of the polyphenylene ether resin is not particularly limited, examples thereof include those having a polyphenylene ether structure as a main component, such as a copolymer of 2,6-dimethylphenol and 2,3,6-trimethylphenol, a copolymer of 2,6-dimethylphenol and o-Cresol, and a copolymer of 2,3,6-trimethylphenol and o-Cresol. From the viewpoint of mechanical strength, poly(2,6-dimethyl-1,4-phenylene ether), a copolymer of 2,6-dimethylphenol and 2,3,6-trimethylphenol, and a mixture thereof are preferable.

As the polyphenylene ether resin, one kind may be singly used, or two or more kinds may be used in combination. In addition, the polyphenylene ether resin may include other various phenylene ether units as partial structures without departing from the desired effects of the present invention. Although the phenylene ether units are not limited to the following, examples thereof include 2-(dialkylaminomethyl)-6-methylphenylene ether units and 2-(N-alkyl-N-phenylaminomethyl)-6-methylphenylene ether units.

Moreover, a modified polyphenylene ether resin obtained by reacting (modifying) a portion or the entirety of the polyphenylene ether with a functionalizing agent including an acyl functional group and one or more kinds selected from the group consisting of carboxylic acid, acid anhydride, acid amide, imide, amine, orthoester, and an hydroxyl carboxylic acid ammonium salt may be used.

The polyarylene ether-based resin may be of only one kind or two or more kinds.

As an embodiment in which two or more kinds of polyarylene ether-based resin are used in combination, for example, an embodiment in which polyarylene ether-based resin having different softening points or melting points are used in combination, an embodiment in which polyarylene ether-based resin having different average molecular weights are used in combination, and the like may be employed. However, the embodiment is not limited thereto.

In this specification, the polyphenylene ether may be referred to as a PPE resin in some cases.

[Mass Ratio (Content) of Polyphenylene Ether Resin]

The mass ratio of the polyarylene ether-based resin (Y) to 100 parts by mass of the polyamide-based resin (X) is preferably 20 parts by mass or more and 300 parts by mass or less. In this range, the rate of decrease in bending strength in a high temperature and high humidity range can be preferably suppressed.

The lower limit of the mass ratio of the polyarylene ether-based resin (Y) to 100 parts by mass of the polyamide-based resin is preferably 20 parts by mass or more, more preferably 30 parts by mass or more, even more preferably 50 parts by mass or more, and most preferably 70 parts by mass or more.

The upper limit of the mass ratio of the polyarylene ether-based resin (Y) to 100 parts by mass of the polyamide-based resin is preferably 300 parts by mass or less, more preferably 240 parts by mass or less, even more preferably 200 parts by mass or less, and most preferably 150 parts by mass or less.

[Form Using Thermoplastic Resin (Z)]

It is preferable that the press-molded product and the composite material in the present invention further contain a thermoplastic resin (Z) in addition to the polyamide-based resin (X) and the polyarylene ether-based resin (Y). The thermoplastic resin (Z) used may be of only one kind or two or more kinds.

(Kind of Thermoplastic Resin (Z))

The kind of the thermoplastic resin (Z) is not limited, but is preferably a polystyrene-based resin.

Examples of the polystyrene-based resin include styrene polymers modified by mixing or interaction of a homopolymer of styrene or a derivative thereof, and a natural or synthetic elastomeric material such as polybutadiene, polyisoprene, butyl rubber, EPDM rubber, an ethylene-propylene copolymer, natural rubber, polysulfide rubber, polyurethane rubber, and epichlorohydrin, and styrene-containing copolymers such as a styrene-acrylonitrile copolymer (SAN), a styrene-butadiene copolymer, a styrene-acrylonitrile-butadiene terpolymer (ABS), a styrene-maleic anhydride copolymer, poly($\alpha$-methyl-styrene), and an ethylvinylbenzene-divinylbenzene copolymer. Furthermore, a preferable resin for the present invention is a rubber-modified polystyrene mixed with or grafted to 3 to 30 wt %, preferably 4 to 12 wt % of a polystyrene homopolymer, polybutadiene rubber, or EPDM rubber.

The polystyrene-based resin may be of only one kind or two or more kinds. As an embodiment in which two or more kinds of polystyrene-based resins are used in combination, for example, an embodiment in which polystyrene-based resins having different softening points or melting points are used in combination, an embodiment in which polystyrene-based resins having different average molecular weights are used in combination, and the like may be employed. However, the embodiment is not limited thereto.

In this specification, the polystyrene may be referred to as a PS resin in some cases.

(Mass Ratio (Content) of Thermoplastic Resin (Z))

In the case of using the thermoplastic resin (Z), the lower limit of the mass ratio of the thermoplastic resin (Z) to 100 parts by mass of the polyamide-based resin (X) is preferably 0.5 parts by mass or more, more preferably 1 part by mass or more, even more preferably 5 parts by mass or more, even more preferably 10 parts by mass or more, even more preferably 20 parts by mass or more, particularly preferably 30 parts by mass or more, and most preferably 30 parts by mass or more.

In the case of using the thermoplastic resin (Z), the upper limit of the mass ratio of the thermoplastic resin (Z) to 100 parts by mass of the polyamide-based resin (X) is preferably 300 parts by mass or less, more preferably 200 parts by mass or less, even more preferably 150 parts by mass or less, even more preferably 120 parts by mass or less, particularly preferably 100 parts by mass or less, and most preferably 80 parts by mass or less.

(Dynamic Viscoelasticity Measurement)

In the case of using the thermoplastic resin (Z) in addition to the polyamide-based resin (X) and the polyarylene ether-based resin (Y) in the press-molded product and the composite material in the present invention, it is preferable that the viscosity at 230° C. in dynamic viscoelasticity measurement at a rate of temperature decrease of 5° C./min, decreasing from 270° C. to 200° C., and 10 rad/sec is 10,000 to 60,000 Pa·sec.

In general, a polymer alloy consisting of the polyamide-based resin (X), the polyarylene ether resin (Y), and the thermoplastic resin (Z) has a higher viscosity than the polyamide-based resin (X) single component, and as a result, the injection pressure is approximately doubled in a case of injection molding.

On the other hand, in the press-molded product and the composite material in the present invention, compared to a case where only the polyamide-based resin (X) is used as a matrix resin, there is no significant difference in viscosity $\eta$ during dynamic viscoelasticity measurement, and the viscosity is in a range which is substantially the same as that of the press-molded product manufactured with the polyamide-based resin (X).

Specifically, the above-mentioned viscosity $\eta$ is preferably 0.6 $\eta_x$ or more and 1.4 $\eta_x$ or less. Here, $\eta_x$ represents the viscosity value of the press-molded product generated by replacing the polyarylene ether-based resin (Y) and the thermoplastic resin (Z) with the polyamide-based resin (X) in the present invention. The lower limit thereof is more preferably 0.7 $\eta_x$ or more, and even more preferably 0.8 $\eta_x$ or more. The upper limit thereof is more preferably 1.3 $\eta_x$ or more, and even more preferably 1.2 $\eta_x$ or more. In addition, the unit of $\eta$ and $\eta_x$ is Pa·sec.

As a result, surprisingly, in a case where the press-molded product is manufactured by cold pressing using the composite material of the present invention, a cold-press-molded product capable of maintaining high mechanical properties even in high temperature and high humidity environments while maintaining excellent spreadability, formability, and fluidity can be produced.

Since the composite material in the present invention does not change in the fiber form or resin form (the sea-island structure of the polymer alloy) before and after pressing, one of the composite material and the press-molded product may be selected and measured.

[Compatibilizer]

It is preferable that the composite material and the press-molded product of the present invention contain a compatibilizer. The compatibilizer is not particularly limited as long as the compatibilizer is a compatibilizer for the polyamide-based resin (X) and the polyarylene ether-based resin (Y).

The content of the compatibilizer with respect to 100 parts by mass of the polyarylene ether-based resin (Y) is preferably 0.05 parts by mass or more, more preferably 0.1 parts by mass or more, even more preferably 0.2 parts by mass or more, and even more preferably 0.3 parts by mass or more. The upper limit thereof is preferably 10 parts by mass or less, more preferably 8 parts by mass or less, and even more preferably 6 parts by mass or less.

The compatibilizer means a polyfunctional compound which interacts with the polyamide-based resin, the PPE resin, or both. This interaction may be chemical (for example, grafting) or physical (for example, affecting the surface properties of a dispersed phase).

The kind of the compatibilizer is not particularly limited, and a well-known compatibilizer as described in, for example, JP-A-11-241017 may be used.

Specifically, at least one selected from citric acid, maleic acid, itaconic acid, and anhydrides thereof can be used. Citric acid, maleic acid, or an anhydride thereof is preferable. Maleic acid or an anhydride thereof can compatibilize polyamide and polyphenylene ether in a relatively small amount and is thus preferable.

Citric acid is the most preferable material because sufficient reactivity is achieved in the two reactions including the functionalization reaction of the PPE resin and the reaction between the functionalized PPE resin and the polyamide-based resin and the decomposition reaction of nylon by the unreacted compatibilizer is not accelerated.

In addition, it is generally well known that a PPE resin and polystyrene are inferior in impact properties compared to a nylon-based resin and thus an impact modifier is added thereto. However, the inventors found that when a polymer alloy having a sea-island structure in which the island phase is uniformly dispersed is produced by examining the amount of the compatibilizer added, surprisingly, the impact energy value of the press-molded product becomes equal to or higher than that produced using only the polyamide-based resin.

[Other Thermoplastic Resins]

In a range in which the effects of the present invention are not impaired, the following thermoplastic resin may be separately used in combination as a resin other than the polyamide-based resin (X) and the polyarylene ether-based resin (Y) (in the case of using the thermoplastic resin (Z), as a resin other than the polyamide-based resin (X), the polyarylene ether-based resin (Y), and the thermoplastic resin (Z)).

Examples thereof include polyolefin-based resins such as a polyethylene resin, a polypropylene resin, a polybutadiene resin, a polymethylpentene resin, a vinyl chloride resin, a vinylidene chloride resin, a vinyl acetate resin, and a polyvinyl alcohol resin, polyester resins such as a polyethylene terephthalate resin, a polyethylene naphthalate resin, a polybutylene terephthalate resin, a polytrimethylene terephthalate resin, and a liquid-crystal polyester, a polyacetal resin, a polycarbonate resin, a polyoxymethylene resin, a (meth) acrylic resin such as polymethyl methacrylate, a polyarylate resin, a thermoplastic polyimide resin, a polyamideimide resin, a polyetherimide resin, a polyether nitrile resin, a phenoxy resin, a polyphenylene sulfide resin, a polysulfone resin, a modified polysulfone resin, a polyether sulfone resin, a polyketone resin, a polyether ketone resin, a polyether ether ketone resin, a polyether ketone ketone resin, a urethane resin, a fluorine-based resin such as polytetrafluoroethylene, and a polybenzimidazole resin.

The thermoplastic resin separately used in combination may be of only one kind or two or more kinds. As an embodiment in which two or more kinds of thermoplastic resins are used in combination, for example, an embodiment in which thermoplastic resins having different softening points or melting points are used in combination, an embodiment in which thermoplastic resins having different average molecular weights are used in combination, and the like may be employed. However, the embodiment is not limited thereto.

[Other Agents]

In a range in which the object of the present invention is not impaired, the press-molded product and the composite material of the present invention may include various additives including additives such as a flame retardant, a UV resistant agent, a light stabilizer, an antioxidant, a thermal stabilizer, a pigment, a mold release agent, a softener, a plasticizer, and a surfactant, a thermosetting resin, a filler, a reinforcing fiber other than carbon fibers, and nano-additives such as carbon nanotubes and cellulose nanofibers.

[Sea-Island Structure]

In the press-molded product and the composite material in the present invention, the carbon fibers include carbon fiber bundles, and inside and outside the carbon fiber bundles, a sea-island structure in which one of the polyamide-based resin (X) and the polyarylene ether-based resin (Y) forms a sea phase and the other forms an island phase is formed. In addition, it is preferable that in the sea-island structure, the polyamide-based resin (X) forms the sea phase and the polyarylene ether-based resin (Y) forms the island phase.

The sea-island structure refers to a dispersed structure in which a matrix (sea phase) having one resin component as a main component of the matrix is dotted with particles (island phase) having the other resin component as a main component of the particles, and the dispersed shape of the island phase in the sea phase is a spherical shape (circular), elliptical shape, or irregular shape.

The inside of the carbon fiber bundle is a region inside the carbon fiber bundle contained in the press-molded product or the composite material, and more specifically, is a part between single fibers of the carbon fibers contained in the carbon fiber bundle in the press-molded product and the composite material.

The outside of the carbon fiber bundle is a region outside the carbon fiber bundle contained in the press-molded product and the composite material, more specifically, is a part other than the carbon fibers in the press-molded product and the composite material.

(Sea-Island Structure in Case of Using Thermoplastic Resin (Z))

In the press-molded product and the composite material in the present invention, one of the polyamide-based resin (X) and the polyarylene ether-based resin (Y) has a sea phase and the other has an island phase. However, in the case of including the thermoplastic resin (Z), it is preferable to mix the thermoplastic resin (Z) with the polyarylene ether-based resin (Y) to form a mixed phase. That is, it is preferable that the polyarylene ether-based resin (Y) and the thermoplastic resin (Z) are compatible with each other. Contrary to this, it is preferable that the phase of the polyamide-based resin (X) is not mixed with the phase of the polyarylene ether-based resin (Y) and the thermoplastic resin (Z).

In addition, the island phase may be the polyamide-based resin (X) and the sea phase may be the mixed phase of the polyarylene ether-based resin (Y) and the thermoplastic resin (Z). However, it is more preferable that the sea phase is the polyamide-based resin (X) and the island phase is the mixed phase of the polyarylene ether-based resin (Y) and the thermoplastic resin (Z).

[Comparison to Injection-Molded Product]

In the related art, a technique of adding carbon fibers to a polymer alloy and performing injection molding on the resultant is widely known (for example, JP-A-2010-222578).

In a case of performing injection molding on a composite material in which a polymer alloy is selected as a matrix, not only is a high injection pressure required, but also the resin is subjected to shearing in a kneading step during the injection molding. Therefore, two thermoplastic resin components (for example, a polyamide-based resin and a polyarylene ether-based resin) easily form a sea-island structure. In addition, since thermal history applied during molding is smaller than that during press molding, thermal decomposition of the resins contained in the material or various additives is suppressed.

In contrast, it is difficult to maintain the sea-island structure in a case of a press-molded product containing carbon fibers having a weight average fiber length of 1 mm or more.

That is, even when a polymer alloy component in the related art in which a sea-island structure is formed in advance by kneading is used, there may be cases where the sea-island structure cannot be maintained as it is (especially before and after heating) in a manufacturing process of a composite material containing carbon fibers having a weight average fiber length of 1 mm or more or in a manufacturing process of a press-molded product using the composite material. It is thought that this is caused by, in addition to a direct factor that the sea-island structure is broken by a high degree of thermal history in the manufacturing process of the press-molded product, an indirect factor that the sea-island structure is broken by thermal decomposition of various additives.

On the other hand, in the press-molded product of the present invention, the sea-island structure is not significantly changed in the processes of <Composite Material Manufacturing Process 1. Manufacturing of Polymer Alloy Component>, <Composite Material Manufacturing Process 2. Manufacturing of Composite Material Precursor>, and <Composite Material Manufacturing Process 3. Manufacturing of Composite Material>. Accordingly, the press-molded product and the composite material of the present invention can exhibit excellent moldability, spreadability, and formability.

[Particle Diameter Dr of Island Phase]

The particle diameter Dr of the island phase of the sea-island structure in the present invention is 0.05 μm or more and less than 50 μm.

Regarding the particle diameter, assuming that the shape of the island phase is a circle, the diameter converted from the area of the island phase is defined as the particle diameter Dr of the island phase. That is, assuming that the area S of the island phase is S, the particle diameter Dr is expressed as $(4S/\pi)^{1/2}$.

The particle diameter Dr of the island phase in the present invention is defined by weighted average. That is, when the particle diameter of each island phase is represented by $Dr_i$, the weighted average particle diameter Dr of the island phase can be obtained by the following expression.

Weighted average particle diameter of island phase
$Dr=(\Sigma Dr_i^2)/(\Sigma Dr_i)$   Expression (d)

A preferable particle diameter of the island phase is 0.1 μm or more and less than 20 μm, more preferably 0.3 μm or more and less than 15 μm, even more preferably 0.3 μm or more and less than 10 μm, and even more preferably 0.5 μm or more and less than 10 μm.

[Particle Diameter Dr of Island Phase and Distance L Between Carbon Fiber Single Fibers]

When the press-molded product and the composite material in the present invention are observed in a cross-section, it is preferable that a distance L between carbon fiber single fibers which is shorter than the particle diameter Dr of the island phase is present inside the carbon fiber bundle. When observed in the cross-section, it is preferable to observe the cross-section in the film thickness direction of the press-molded product and the composite material.

FIG. 1 shows a schematic view of the sea-island structure when an example of the press-molded product of the present invention is observed in a cross-section (a cross-section in the film thickness direction).

As illustrated in FIG. 1, when the press-molded product of the present invention is observed in the cross-section with an electron microscope (SEM), a sea-island structure in which one of the polyamide-based resin (X) and the polyarylene ether-based resin (Y) forms sea phases 103 and the other forms island phases 102 is formed inside and outside a carbon fiber bundle 101. In addition, in the cross-section of the press-molded product or the composite material, the shape of the carbon fiber bundle 101 and single fibers 104 of carbon fibers observed in an orientation direction is circular or elliptical. Inside the carbon fiber bundle 101, the island phases 102 may be arranged and dispersed in the form of straddling the carbon fiber single fibers 104 adjacent to each other. Accordingly, during cold pressing in a low shear region, even a carbon fiber bundle which is difficult to change in shape easily deforms like a matrix resin and, surprisingly, the spreadability and formability are improved.

In addition, inside the carbon fiber bundle, it is preferable that at least one island phase is in contact with the carbon fibers.

[Composite Material]

The material for manufacturing the press-molded product of the present invention is a composite material (the "composite material" described in this specification refers to a material before the press-molded product is manufactured). The form of the fiber in the composite material is maintained in the press-molded product, and thus the fiber form of one of the composite material and the press-molded product may be evaluated.

[Manufacturing Method of Composite Material]

The composite material can be generally manufactured by a well-known method, and for example, can be manufactured by the following processes. In <Composite Material Manufacturing Process 1>, resins are kneaded in advance to form the sea-island structure, and there is no kneading step in the subsequent steps.

<Composite Material Manufacturing Process 1. Manufacturing of Polymer Alloy Component>

A method of preparing the polymer alloy component of the polyamide-based resin (X) and the polyarylene ether-based resin (Y) (preferably the polymer alloy component to which the thermoplastic resin (Z) is added) is not particularly limited, and an existing method can be used.

For example, in the presence of a compatibilizer, the polyamide-based resin (X) and the polyarylene ether-based resin (Y) are kneaded in a range of approximately 240° C. to 300° C. using a twin-shaft kneader to obtain a polymer alloy, and the polymer alloy may be produced in the form of pellets or a film.

In a case where only the two components, that is, the polyamide-based resin (X) and the polyarylene ether-based resin (Y) are used, it is preferable that the melt viscosity of the polyamide-based resin (X) at a temperature of 280° C. and a shear rate of 550 $sec^{-1}$, measured by a capillary rheometer, is 500 to 10,000 Pa·s, and the melt viscosity of the polyarylene ether-based resin (Y) is 5,000 to 250,000 Pa·s, and it is more preferable that the melt viscosity of the polyamide-based resin (X) is 1,000 to 5,000 Pa·s, and the melt viscosity of the polyarylene ether-based resin (Y) is 20,000 to 75,000 Pa·s. In addition, the melt viscosity of the polyarylene ether-based resin (Y) is more preferably lower than 25 times the melt viscosity of the polyamide-based resin (X), and even more preferably lower than 20 times.

<Composite Material Manufacturing Process 2. Manufacturing of Composite Material Precursor>

A carbon fiber bundle may be unwound from a creel and cut, and while the cut carbon fiber bundle is spreaded, the polymer alloy of the polyamide-based resin (X) and the polyarylene ether-based resin (Y) (preferably the polymer alloy to which the thermoplastic resin (Z) is added) in the form of pellets, fibers, or powder may be sprayed on an air-permeable support body, thereby producing a composite material precursor.

Otherwise, after the cut carbon fiber bundle is spreaded and sprayed on the air-permeable support body, the polymer alloy of the polyamide-based resin (X) and the polyarylene ether-based resin (Y) (preferably the polymer alloy to which the thermoplastic resin (Z) is added) in the form of a film may be interposed therebetween, thereby producing a composite material precursor.

<Composite Material Manufacturing Process 3. Manufacturing of Composite Material>

The carbon fiber bundle sprayed on the composite material precursor is impregnated with a thermoplastic resin by being heated (preferably pressurized) to the softening temperature of the thermoplastic resin.

The term "softening temperature" refers to a temperature at which the rigidity of a molded product made of only the matrix resin (the polyamide-based resin (X) and the polyarylene ether-based resin (Y), or the polyamide-based resin (X), the polyarylene ether-based resin (Y), and the thermoplastic resin (Z)) is not maintained and the molded product easily deforms.

A two-dimensional random array mat which is a composite material precursor and a manufacturing method thereof, and a manufacturing method of a composite material (Composite Material Manufacturing Processes 2 and 3 described above) are described in detail in U.S. Pat. No. 8,946,342 and JP-A-2013-49208.

The thickness of the composite material of the present invention is not particularly limited, and is typically preferably in a range of 0.01 mm to 100 mm, preferably in a range of 0.01 mm to 10 mm, and more preferably in a range of 0.1 to 3.0 mm In a case where the composite material of the present invention has a structure in which a plurality of layers are stacked, the thickness refers not to the thickness of each layer but to the total thickness of the composite material which is the sum of the layers.

[Manufacturing Method of Press-Molded Product]

The press-molded product in the present invention is obtained by press-molding the composite material.

The composite material for manufacturing the press-molded product includes the carbon fibers having a weight average fiber length of 1 mm or more, the polyamide-based resin (X), and the polyarylene ether-based resin (Y), in which the carbon fibers include carbon fiber bundles, a sea-island structure in which one of the polyamide-based resin (X) and the polyarylene ether-based resin (Y) forms a sea phase and the other forms an island phase is formed inside and outside the carbon fiber bundles, and the particle diameter of the island phase of the sea-island structure is 0.05 µm or more and less than 50 µm.

As a preferable molding method to manufacture the press-molded product of the present invention, compression molding using cold pressing or hot pressing is used.

(Cold Pressing Method)

In the cold pressing method, for example, a composite material heated to a first predetermined temperature is put into a mold set to a second predetermined temperature, and thereafter pressurization and cooling are performed thereon. That is, the cold pressing method include at least Steps A-1) to A-3) as follows.

Step A-1) A step of heating the composite material to a temperature equal to or higher than the softening temperature of the thermoplastic resin contained in the composite material.

Step A-2) A step of arranging the heated composite material obtained in Step A-1) described above in a mold which is adjusted to a temperature lower than the softening temperature of the thermoplastic resin.

Step A-3) A step of pressurizing and molding the composite material arranged in the mold in Step A-2).

Through these steps, molding of the composite material can be completed.

(Hot Pressing Method)

The hot pressing method includes at least Steps B-1) to B-3) as follows.

Step B-1) A step of arranging the composite material in a mold.

Step B-2) A step of raising the temperature of the mold to a temperature equal to or higher than the softening temperature of the thermoplastic resin and pressurizing the mold.

Step B-3) A step of adjusting the temperature of the mold to less than the softening point of the thermoplastic resin and performing molding.

(Common Matters to Both Pressing Methods)

The composite material is used singly (in one sheet) or in a plurality of sheets, depending on the plate thickness of a target molded product when put into the mold. In a case of using a plurality of sheets, the plurality of sheets may be preliminarily stacked and heated, the heated composite material may be stacked and thereafter put into the mold, or the heated composite material may be sequentially stacked in the mold. The temperature difference between the composite material at the lowest layer and the composite material at the highest layer in the stacked case may be small. From this viewpoint, it is preferable to stack the composite material before being put into the mold.

The above steps need to be performed in the above order, but other steps may be included between the steps. Examples of the other steps include a preliminary shaping step of preliminarily performing shaping into the shape of the cavity of the mold using a shaping apparatus different from the mold used in Step A-3) or B-2) before Step A-3) or B-2).

In addition, Steps A-3) and B-2) are steps to obtain a molded product having a desired shape by applying a pressure to the composite material, and the molding pressure at this time is not particularly limited, and is preferably less than 30 MPa, more preferably 20 MPa or less, and even more preferably 10 MPa or less.

Also, as a matter of course, various steps may be inserted between the above steps during press molding. For example, vacuum compression molding in which press molding is performed in a vacuum may also be used.

[Cold Press Molding]

In a case where press molding is performed by the cold press method, there is an advantage that the molding time is shorter than that of the hot pressing method, whereas the temperature of the mold is low, leading to a difficulty in the fluidity of the composite material or a reduction in the formability.

(Spreadability)

In general, since the composite material is shaped by being folded during the press molding, particularly in the case of cold pressing, the corner portion of the molded product is likely to be insufficient in spreadability and is likely to be formed with thickness unevenness due to generated wrinkles. When the thickness unevenness occurs, it becomes difficult to close the mold, and molding is not completed. Moreover, there is a concern of breaking the mold. In addition, the press-molded product with the corner portion manufactured requires not only excellent spreadability but also mechanical properties of a press-molded product in high temperature and high humidity environments. However, in a case where a polymer alloy consisting of a polyamide-based resin and a polyarylene ether-based resin is selected to withstand use in high temperature and high humidity environments and is subjected to injection molding, in the related art, the injection pressure is high. Therefore, the polymer alloy is a material that is not easily molded.

On the other hand, when the composite material in the present invention is used, the composite material not only can withstand the use in high temperature and high humidity environments but also has excellent spreadability. The inventors thought that this is because the sea-island structure in which one of the polyamide-based resin (X) and the polyarylene ether-based resin (Y) forms the sea phase and the other forms the island phase inside and outside the carbon fiber bundles is formed and this is maintained even in the press-molded product.

Although the evaluation of the spreadability will be described later, two sheets of the composite material are stacked and cold-pressed and the degree of approximation to the thickness of a single sheet of the composite material may be evaluated.

(Formability)

In the case of using the cold press method, the formability of the composite material is also required to the extent that the composite material can be processed into a complex shape, like the spreadability. With good formability, even when a press-molded product having a complex shape such as a deep-drawn shape is manufactured, the shape of the molded product is flexibly changed according to the shape, and thus the molded product can be shaped into a thickness with high uniformity. In addition, with good formability, it becomes possible to mold the composite material at a lower molding pressure than that for a composite material of the related art, and thus the composite material can be processed into a complex shape using a smaller molding machine. Therefore, there are significant advantages.

The fluidity and the formability are different concepts, and good fluidity does not necessarily mean excellent formability.

(Fluidity)

The composite material arranged in a lower mold of the mold is pressed by an upper mold of the mold such that the composite material flows. That is, the flow of the composite material after the start of the pressing until the completion of the molding is referred to as flow. When the fluidity of the composite material is good, the composite material flows when pressed. However, when the fluidity is too good (the fluidity is excessive), it is difficult to shape the composite material into a target shape.

In the case of using the composite material of the present invention, particularly the composite material as a preferable embodiment of the present invention, which includes the thermoplastic resin (Z) in addition to the polyamide-based resin (X) and the polyarylene ether-based resin (Y) and in which the viscosity η at 230° C. in dynamic viscoelasticity measurement at a rate of temperature decrease of 5° C./min, 270° C. to 200° C., and 10 rad/sec is 10,000 to 60,000 Pa·sec, the fluidity does not significantly decrease compared to a polyamide-based resin single component. This is quite different from the flow characteristics (in a case of a polymer alloy, the injection pressure needs to be high) of a polymer alloy during injection molding as the general knowledge of injection molding used in the related art, and a different effect is exhibited.

[Molded Product]

The thickness of the press-molded product of the present invention is not particularly limited, and is typically preferably in a range of 0.01 mm to 100 mm, preferably in a range of 0.01 mm to 10 mm, and more preferably in a range of 0.1 to 3.0 mm In the case where the press-molded product of the present invention has a configuration in which a plurality of layers are stacked, the thickness refers not to the thickness of each layer but to the total thickness of the molded product which is the sum of the layers.

The molded product used in the present invention may have a single layer structure consisting of a single layer or may also have a stacked structure in which a plurality of layers are stacked.

As an embodiment in which the press-molded product has the stacked structure, an embodiment in which a plurality of layers having the same composition are stacked, or an embodiment in which a plurality of layers having different compositions are stacked may be employed.

[Outer Appearance of Molded Product]

In the related art, in a case of a composite material made of a polyamide-based resin (for example, a composite material made of a polyamide-based resin described in International Publication No. 2012/165418), the surface smoothness thereof tends to decrease. This is because the polyamide-based resin is a crystalline resin and thus a high degree of volume shrinkage occurs during molding and solidification. Particularly in a case where carbon fibers are dispersed at two-dimensional random, the two-dimensional direction of the press-molded product is reinforced by the carbon fibers. Therefore, as the degree of volume shrinkage of the polyamide-based resin in the two-dimensional direction decreases, the degree of volume shrinkage of the press-molded product in the plate thickness direction increases. The inventors thought that the carbon fibers are consequently exposed to the surface of the press-molded product and thus the surface smoothness decreases (the outer appearance is deteriorated).

On the other hand, since the press-molded product or the composite material of the present invention uses the polyarylene ether-based resin, which is an amorphous resin, in addition to the polyamide-based resin, and molding shrinkage can be suppressed to some extent, thereby improving the outer appearance. From this viewpoint, in the case of adding the thermoplastic resin (Z), the thermoplastic resin (Z) is preferably an amorphous resin and more preferably a polystyrene-based resin.

EXAMPLES

Hereinafter, the present invention will be described in detail with reference to examples, but the present invention is not limited thereto.

1. Raw materials used in the following manufacturing examples and examples are as follows. The decomposition temperature is the measurement result by thermogravimetric analysis.

PAN-Based Carbon Fiber

Carbon fiber "TENAX" (registered trademark) STS40-24KS (average fiber diameter 7 μm) manufactured by Toho Tenax Co., Ltd.

Polyamide 6

Sometimes abbreviated as PA6 resin. Crystalline resin, melting point 225° C., decomposition temperature (in air) 300° C.

Polyamide 66

Sometimes abbreviated as PA66 resin. Crystalline resin, melting point 263° C., decomposition temperature (in air) 300° C.

Polyphenylene Ether

Sometimes abbreviated PPE resin. Amorphous resin, glass transition point 205° C. to 215° C.

Polystyrene

Sometimes abbreviated PS resin. Amorphous resin, glass transition point 95° C. to 100° C.

Compatibilizer

Maleic anhydride (Wako Special grade) manufactured by Wako Pure Chemical Industries, Ltd.

Citric acid (food additive) manufactured by Wako Pure Chemical Industries, Ltd.

2. Each value in these examples was obtained by the following methods.

(1) Analysis of Carbon Fiber Volume Fraction (Vf)

The molded product was burned in a furnace at 500° C. for 1 hour to remove the thermoplastic resin, and by weighing the mass of the specimen before and after the treatment, the masses of the carbon fibers and the thermoplastic resin were calculated. Next, using the specific gravity of each component, the volume fractions of the carbon fibers and the thermoplastic resin were calculated.

$Vf=100\times$carbon fiber volume/(carbon fiber volume+ thermoplastic resin volume)   Expression (c)

(2) Analysis of Weight Average Fiber Length of Carbon Fibers Contained in Molded Product Regarding the weight average fiber length of the carbon fibers contained in the molded product, after removing the thermoplastic resin in the furnace at 500° C. for 1 hour, the lengths of 100 carbon fibers randomly extracted were measured with a caliper and a loupe up to 1 mm unit and were recorded, and the weight average fiber length (Lw) was obtained from the lengths (Li, where i=an integer from 1 to 100) of all the measured carbon fibers by the following expression.

$Lw=(\Sigma Li^2)/(\Sigma Li)$   Expression (b)

The weight average fiber length of carbon fibers contained in the composite material can also be measured in the same manner as described above.

(3) Dynamic Viscoelasticity Measurement

The prepared composite material was interposed between parallel plates having a diameter of 20 mm using RDA III manufactured by TA Instruments, and by performing dynamic viscoelasticity measurement with a normal load of 200 g, a frequency of 1.6 Hz (10 rad/sec), a strain of 0.02%, a temperature decreasing range of 270° C. to 200° C., and a rate of temperature decrease of 5° C./min, the viscosity at 230° C. was read.

(4) Measurement of Rate of Decrease in Bending Strength

A test piece was cut from the press-molded product using a water jet, and the bending strength was measured using a universal testing machine manufactured by Instron with reference to JIS K 7074-1988. The fulcrum distance (Lt) is calculated from Lt=40×h (h is the thickness of the test piece), and the test speed was 5 mm/min.

Regarding the bending strength, by measuring each of a bending strength (F1) in a state in which the polyamide-based resin (X) was absolutely dry (a state in which no water was absorbed) at 23° C., and a bending strength (F2) in a state in which, after the polyamide-based resin (X) entered a saturated state by absorbing water from the state in which the polyamide-based resin (X) was absolutely dry (a state in which no water was absorbed) at 23° C., the temperature was increased therefrom to 80° C., The rate of decrease in bending strength was measured. The rate of decrease in bending strength was calculated by the following expression.

Rate of decrease in bending strength (%)=100×(F1−F2)/F1

(5) Observation of Cross-Section of Composite Material and Cold-Press-Molded Product (Microphase Separation Structure, Observation of Sea-Island Structure)

A specimen was produced by cutting an ultra thin section from the composite material (or the cold-press-molded product) using an ultramicrotome, and was collected in a Cu grit, and the polyamide-based resin was stained with an aqueous solution of 5% PTA (phosphotungstic acid) for 3 hours. Thereafter, the specimen was washed with water, wind-dried, and then observed with SEM (Quanta 250 FEG manufactured by FEI).

The observation condition was set to an accelerating voltage of 5 kV in STEM mode.

In addition, evaluation of the sea-island structure was classified as follows.

(5-1) Particle Diameter Dr of Island Phase

Three images with a magnification of 5,000 times were produced by the electron microscope (SEM) described above by randomly varying the position, all the island phases in the areas included in the three images were observed to measure the areas and calculate the diameters, and the particle diameter Dr was obtained by weighted averaging. In addition, the island phases were observed inside the carbon fiber bundles and outside the carbon fiber bundles, respectively.

(5-2) Observation of Outside of Carbon Fiber Bundle

Excellent: A sea-island structure was formed and was dispersed uniformly and regularly. The size of the particle diameter Dr was less than 15 μm.

Great: Although a sea-island structure was formed, the size thereof was irregular (the size was not uniform). The size of the particle diameter Dr was less than 15 μm.

Good: Although a sea-island structure was formed, the sea phase was a PPE resin and the island phase was a polyamide-based resin.

Bad: The size of the particle diameter Dr was 50 μm or more.

(5-3) Observation of Inside of Carbon Fiber Bundle

Excellent: A sea-island structure was formed and was dispersed uniformly and regularly. The size of the particle diameter Dr was less than 15 μm.

Great: Although a sea-island structure was formed, the size thereof was irregular (the size was not uniform). The size of the particle diameter Dr was less than 15 μm.

Good: Although a sea-island structure was formed, the sea phase was a PPE resin and the island phase was a polyamide-based resin.

Bad: A huge island phase was formed in the fiber bundle. Since the island phase was excessive, the particle diameter Dr could not be measured.

Since the particle diameter is calculated assuming that the island phase is a circle and the diameter converted from the area of the island phase is calculated as the particle diameter Dr of the island phase (assuming that the area of the island component is S, the particle diameter Dr is $(4S/\pi)^{1/2}$), even in a case where the inter-fiber distance is 1 to 10 μm, there may be cases where the particle diameter Dr becomes larger than the inter-fiber distance.

(5-4) Inter-Fiber Distance Inside Carbon Fiber Bundle

An image with a magnification of 5,000 times was produced by the electron microscope (SEM) described above, and for arbitrary 50 carbon fiber single fibers, the shortest distance from the interface between the carbon fiber single fiber and the resin to the interface between the adjacent carbon fiber and the resin was measured.

(6) Observation of Cross-Section of Polymer Alloy Component

In <Composite Material Manufacturing Process 1. Manufacturing of Polymer Alloy Component> described below, immediately after manufacturing the polymer alloy component (immediately after the kneading), observation of the cross-section of the polymer alloy component was performed in the same manner as in the evaluation of (5) described above, and the microphase separation structure was evaluated.

Excellent: A sea-island structure was formed and was dispersed uniformly and regularly. The size of the particle diameter Dr was less than 15 μm.

Great: Although a sea-island structure was formed, the size thereof was irregular (the size was not uniform). The size of the particle diameter Dr was less than 15 μm.

Good: Although a sea-island structure was formed, the sea phase was a PPE resin and the island phase was a polyamide-based resin.

Bad: The size of the particle diameter Dr was 50 μm or more.

(7) Conditions of Cold Pressing

In order to evaluate spreadability during cold pressing, fluidity, formability, and the outer appearance of a press-molded product obtained by cold pressing, cold pressing was performed. The conditions of the cold pressing are as follows.

The composite material was dried for 4 hours by a 120° C. hot air dryer and was thereafter heated to a temperature of 290° C. by an infrared heater. A mirror-finished mold was set at 150° C., and the composite material increased in temperature was introduced into the mold and then pressurized at a pressure of 20 MPa for 1 minute, thereby obtaining a press-molded product.

(8) Fluidity

A composite material produced to have a target thickness of 1.3 mm (an actual measurement value is shown in the following tables) was cut into a width of 10 cm and a length of 4 cm and was cold-pressed using a mold having a width of 10 cm and a length direction (open shape). A wire was drawn in advance at the end of the composite material before heating, and the distance between the end portion of the press-molded product after molding and the line was measured. In order to more accurately measure the fluidity, the measured distance was divided by the thickness of the composite material, whether the fluidity is good or bad was determined by the divided value (a composite material with a higher calculated value flows).

(9) Spreadability

Figure 2:
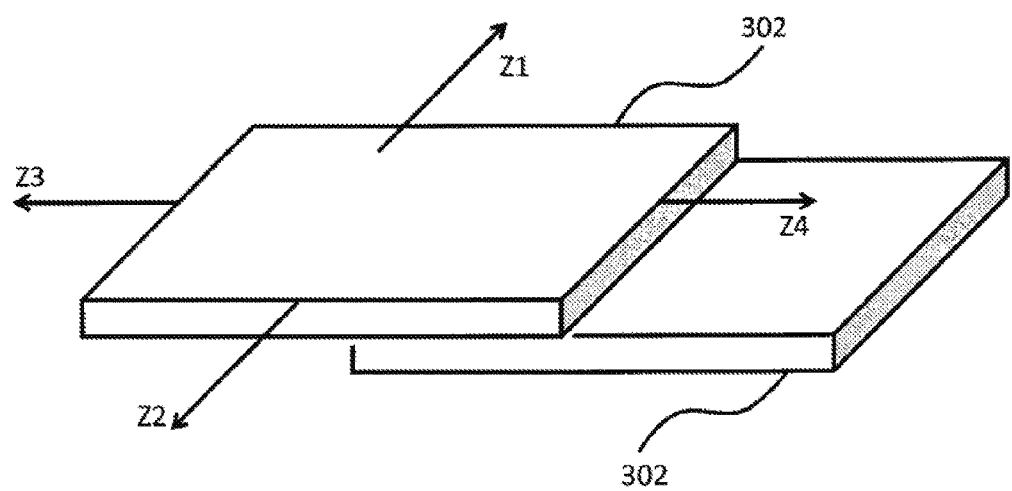
FIG. 2 is a schematic view for explaining an evaluation method of spreadability.

The composite material produced to have a target thickness of 1.3 mm was cut into two pieces having a width of 9.0 cm and a length of 12.5 cm, the cut pieces of the composite material were overlapped by 5 cm in the length direction as illustrated in FIG. 2 and were arranged in, as a flat plate-shaped mold, a mold in which open cavities are formed in two side directions (the direction Z4 in FIG. 2 (a direction parallel to the length direction of a composite material 302) and the direction Z2 (a direction parallel to the width direction of the composite material 302)) and closed cavities are formed in the remaining two side directions (the direction Z3 in FIG. 2 (a direction parallel to the length direction of the composite material 302) and the direction Z1 (a direction parallel to the width direction of the composite material 302)), and cold pressing was performed thereon.

Among the obtained press-molded products, the thicknesses of 10 points of the part molded while being overlapped were measured and averaged, and a value was calculated by dividing the average by the thickness of a single piece of the composite material (before molding). As this value is closer to 1, better spreadability is achieved.

(10) Evaluation of Formability

Figure 3:
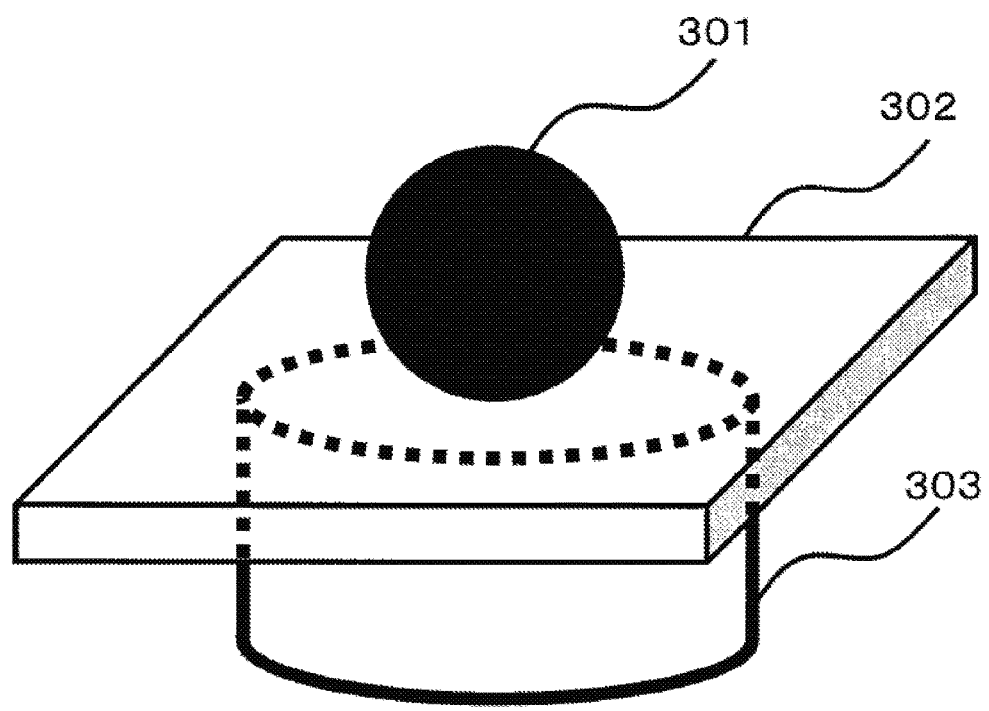
FIG. 3 is a schematic view for explaining an evaluation method of formability.

A composite material was produced to have a target thickness of 2.6 mm and was cut into 10 cm ×10 cm. An iron ball having a weight of 175 g previously heated to 270° C. was placed on the composite material placed on a cylindrical object as illustrated in FIG. 3 and then heated in a muffle furnace at 270° C. for 20 minutes. The obtained sample was cooled to 23° C. and observed. The formability was evaluated according to the following criteria. In the following criteria, a higher number means better formability.

5: The shape of the iron ball was transferred to the composite material, and the deformation length in the vertical direction was 12 mm or more.

4: The shape of the iron ball was transferred to the composite material, and the deformation length in the vertical direction was 10 mm or more and less than 12 mm 3: The shape of the iron ball was not transferred to the composite material, and the deformation length in the vertical direction was 7.5 mm or more and less than 10 mm 2: The shape of the iron ball was not transferred to the composite material, and the deformation length in the vertical direction was 7 mm or more and less than 7.5 mm 1: The shape of the iron ball was not transferred to the composite material, and the deformation length in the vertical direction was less than 7 mm

(12) Evaluation of Outer Appearance of Press-Molded Product

The outer appearance was evaluated according to the following criteria. In the following criteria, a higher number means better outer appearance.

4: Carbon fibers were not exposed to the surface by visual inspection.

3: Carbon fibers exposed to the surface were partially shown depending on the adjustment of light, but carbon fibers were not substantially exposed.

2: Most of the carbon fibers were exposed, but there may be cases where carbon fibers were not shown depending on the adjustment of light.

1: Carbon fibers were exposed to the surface of the press-molded product and the surface was uneven.

(13) Evaluation of Impact Absorbed Energy

The amount of absorbed energy was measured by conducting a multiaxial impact test using a VHS high-speed impact testing machine manufactured by Instron. The size of the test piece was set to 65×65 mm, the striker diameter was set to 20 mm, the opening diameter of the presser jig was set to 40 mm, and the test speed was set to 2.2 m/sec. The area of the displacement-load curve obtained in this test was used as the amount of absorbed energy.

Example 1

<Composite Material Manufacturing Process 1. Manufacturing of Polymer Alloy Component>

As a thermoplastic resin, a polyamide 6 resin (nylon 6 resin) A1030 manufactured by UNITIKA Ltd. and a PPO 630 resin (2,6-dimethyl-1,4-phenylene ether, PPE resin) manufactured by SABIC were prepared, 100 parts by mass of the PPE resin with respect to 100 parts by mass of the polyamide 6 and 1 part by mass of citric acid manufactured by Wako Pure Chemical Industries, Ltd. with respect to 100 parts by mass of the PPE resin were mixed together in this ratio, the mixture was put into a kneading machine (TEM-26SS manufactured by Toshiba Machine Co., Ltd.) and was kneaded at a setting temperature of 280° C., a feed rate of 20 kg/h, and a screw rotation speed of 200 rpm, thereby preparing a polymer alloy component. When the cross-section of the polymer alloy component was observed, a sea-island structure having the polyamide 6 resin as a sea phase and the PPE resin as an island phase was formed and uniformly dispersed, and the weight average particle diameter Dr of the island phase was 1 μm.

<Composite Material Manufacturing Process 2. Manufacturing of Composite Material Precursor>

A sizing solution of nylon 6/66/12 terpolymer polyamide was produced on the basis of the description of Example of Pamphlet of WO2013/133421.

In the bath of the sizing solution, unsized carbon fiber strands (registered trademark "TENAX STS40-24KS" manufactured by Toho Tenax Co., Ltd.) were continuously immersed so as to cause the filaments to be impregnated with the emulsion. This was caused to pass through a drying furnace at 120° C. to 150° C. for about 120 seconds to be dried, thereby obtaining a carbon fiber bundle having a width of 10 mm and a thickness of 0.162 mm Using the prepared polymer alloy component and the carbon fiber bundle, the carbon fiber volume fraction was calculated to be 35 vol % on the basis of the method described in U.S. Pat. No. 8,946,342, and the carbon fibers and the resin of the polymer alloy component were adjusted, thereby producing a composite material precursor in which the carbon fibers were oriented at two-dimensional random.

Two types of the composite material precursor were prepared, with one having a composite material target thickness of 1.3 mm and the other having a target thickness of 2.6 mm <Composite Material Manufacturing Process 3. Manufacturing of Composite Material>

The obtained composite material precursor was heated at 0.5 MPa for 3 minutes in a press machine heated to 260° C., thereby obtaining a composite material having a target thickness of 1.3 mm and a target thickness of 2.6 mm Analysis of the carbon fibers contained in the obtained composite material was performed. The critical number of single fibers defined in Expression (1) was 86, the average number (N) of single fibers in the carbon fiber bundle (A) having the critical number of single fibers or more was 820, and the proportion of the carbon fiber bundle (A) having the critical number of single fibers or more was 80 vol % of the total carbon fiber amount. In addition, the carbon fiber volume fraction (Vf) was 35 vol %, the fiber length of the carbon fibers was a constant length, and the weight average fiber length was 20 mm In addition, the thickness of the composite material having a target thickness of 1.3 mm was actually measured as 1.16 mm <Molded Product Manufacturing (i) (Hot Press Molding)>

Next, the obtained composite material was hot-pressed at 4.0 MPa for 20 minutes in a press machine heated to 300° C., thereby obtaining a molded product.

<Molded Product Manufacturing (ii) (Cold Press Molding)>

In order to evaluate the fluidity, formability, spreadability, bending strength, outer appearance, and impact strength of the obtained composite material, cold press molding was performed as described above. In the resulting sea-island structure inside and outside the carbon fiber bundle of the obtained molded product, the sea-island structure of the polymer alloy component immediately after the kneading was maintained.

In addition, the inter-fiber distance inside the carbon fiber bundle was measured in the above-described method, and the inter-fiber distances of all of the measured 50 carbon fiber single fibers were 0 to 10 mm Example 2

A press-molded product was produced in the same manner as in Example 1 except that maleic anhydride (Wako Special grade) manufactured by Wako Pure Chemical Industries, Ltd. was used as the kind of a compatibilizer.

Example 3

A composite material and a press-molded product were manufactured in the same manner as in Example 1 except that the polyamide 6 resin A1030 manufactured by UNITIKA Ltd. and the PPO 630 resin (2,6-dimethyl-1,4-phenylene ether) manufactured by SABIC were mixed so that the ratio of the PPE resin to 100 parts by mass of the polyamide 6 was 33.3 parts by mass.

In <Composite Material Manufacturing Process 1. Manufacturing of Polymer Alloy Component>, immediate after producing the polymer alloy components (immediately after kneading), when the cross-section of the polymer alloy components was observed when prepared, a sea-island structure having the polyamide 6 resin as a sea phase and the PPE resin as an island phase was formed and uniformly dispersed, and the weight average particle diameter Dr of the island phase was 0.5 μm.

In the resulting sea-island structure inside and outside the carbon fiber bundle of the obtained molded product, the sea-island structure of the polymer alloy component immediately after the kneading was maintained.

Example 4

A press-molded product was manufactured in the same manner as in Example 1 except that the amount of the compatibilizer added to 100 parts by mass of the polyphenylene ether-based resin was 2 parts by mass.

Example 5

A press-molded product was manufactured in the same manner as in Example 1 except that the amount of the compatibilizer added to 100 parts by mass of the polyphenylene ether-based resin was 4 parts by mass.

Example 6

A press-molded product was manufactured in the same manner as in Example 2 except that the amount of the compatibilizer added to 100 parts by mass of the polyphenylene ether-based resin was 2 parts by mass.

Example 7

<Composite Material Manufacturing Process 1. Manufacturing of Polymer Alloy Component>

As a thermoplastic resin, a polyamide 6 resin A1030 manufactured by UNITIKA Ltd., a PPO 630 resin (2,6-dimethyl-1,4-phenylene ether, PPE resin) manufactured by SABIC, and a polystyrene resin SGP10 (described as PS resin in some cases) manufactured by PS Japan Corporation were prepared, 99.5 parts by mass of the PPE resin, 0.5 parts by mass of the PS resin, and 1 part by mass of citric acid (food additive) manufactured by Wako Pure Chemical Industries, Ltd. with respect to 100 parts by mass of the polyamide 6 were mixed together in this ratio, the mixture was put into a kneading machine (TEM-26SS manufactured by Toshiba Machine Co., Ltd.) and was kneaded at a setting temperature of 280° C., a feed rate of 20 kg/h, and a screw rotation speed of 200 rpm, thereby preparing a polymer alloy component. When the cross-section of the polymer alloy component was observed, a sea-island structure having the polyamide 6 resin as a sea phase and a mixed phase of the PPE resin and the PS resin as an island phase was formed and uniformly dispersed, and the weight average particle diameter Dr of the island phase was 1 μm.

<Composite Material Manufacturing Process 2. Manufacturing of Composite Material Precursor>

A composite material precursor was produced in the same manner as in Example 1.

<Composite Material Manufacturing Process 3. Manufacturing of Composite Material>

A composite material was produced in the same manner as in Example 1.

Analysis of the carbon fibers contained in the obtained composite material was performed. The critical number of single fibers defined in Expression (1) was 86, the average number (N) of single fibers in the carbon fiber bundle (A) having the critical number of single fibers or more was 820, and the proportion of the carbon fiber bundle (A) having the critical number of single fibers or more was 80 vol % of the total carbon fiber amount. In addition, the carbon fiber volume fraction (Vf) was 35 vol %, the fiber length of the carbon fibers was a constant length, and the weight average fiber length was 20 mm <Molded Product Manufacturing (i) (Hot Press Molding)>

A press-molded product was produced through hot pressing in the same manner as in Example 1.

<Molded Product Manufacturing (ii) (Cold Press Molding)>

A press-molded product was produced through cold pressing in the same manner as in Example 1.

Example 8

Example 8 is the same as Example 7 except that a composite material was prepared so that 90 parts by mass of the PPE resin and 10 parts by mass of the PS resin with respect to 100 parts by mass of the PA 6 resin were included and a press-molded product was manufactured.

Example 9

Example 9 is the same as Example 7 except that a composite material was prepared so that 70 parts by mass of the PPE resin and 30 parts by mass of the PS resin with respect to 100 parts by mass of the PA 6 resin were included and a press-molded product was manufactured.

Example 10

Example 10 is the same as Example 7 except that a composite material was prepared so that 50 parts by mass of the PPE resin and 50 parts by mass of the PS resin with respect to 100 parts by mass of the PA 6 resin were included and the amount of citric acid added to 100 parts by mass of the polyphenylene ether-based resin was 2 parts by mass, and a press-molded product was manufactured.

Example 11

Example 11 is the same as Example 10 except that a composite material was prepared so that the amount of citric acid added to 100 parts by mass of the polyphenylene ether-based resin was 3 parts by mass, and a press-molded product was manufactured.

Example 12

A composite material and a press-molded product were manufactured in the same manner as in Example 2 except that the polyamide 6 resin A1030 manufactured by UNITIKA Ltd. and the PPO 630 resin (2,6-dimethyl-1,4-phenylene ether, PPE resin) manufactured by SABIC were mixed so that the ratio of the PPE resin to 100 parts by mass of the polyamide 6 was 150 parts by mass.

Since the PPE resin was included in a large amount, the polyamide 6 resin was the island phase and the PPE resin was the sea phase in the sea-island structure.

Example 13

A composite material and a press-molded product were manufactured in the same manner as in Example 10 except that a polyamide 66 resin manufactured by DSM Engineering Plastics (3010SR) as a polyamide-based resin was used and citric acid manufactured by Wako Pure Chemical Industries, Ltd. as a compatibilizer was prepared to occupy 3 parts by mass with respect to 100 parts by mass of the PPE resin.

Comparative Example 1

A composite material and a press-molded product were manufactured in the same manner as in Example 1 except that the polyarylene ether-based resin was not used and the composite material was produced only by the polyamide 6.

Comparative Example 2

<Composite Material Manufacturing Process 1. Manufacturing of Polymer Alloy Component>

A polymer alloy component was prepared in the same manner as in <Composite Material Manufacturing Process 1. Manufacturing of Polymer Alloy Component> of Example 1 except that the compatibilizer was not used.

When the cross-section of the polymer alloy component was observed, a sea-island structure having the polyamide 6 resin as a sea phase and the PPE resin as an island phase was formed and evaluated as Great.

<Composite Material Manufacturing Process 2. Manufacturing of Composite Material Precursor>

A carbon fiber bundle was prepared in the same manner as in Example 1, using the produced polymer alloy component and the carbon fiber bundle, the carbon fiber volume fraction was calculated to be 35 vol % on the basis of the method described in U.S. Pat. No. 8,946,342, and the carbon fibers and the resin of the polymer alloy component were adjusted, thereby producing a composite material precursor in which the carbon fibers were oriented at two-dimensional random.

Two types of the composite material precursor were prepared, with one having a composite material target thickness of 1.3 mm and the other having a target thickness of 2.6 mm <Composite Material Manufacturing Process 3. Manufacturing of Composite Material>

The obtained composite material precursor was heated at 0.5 MPa for 3 minutes in a press machine heated to 260° C., thereby obtaining a composite material having a target thickness of 1.3 mm and a target thickness of 2.6 mm At this time, when the sea-island structure in the composite material was observed, the sea-island structure was evaluated as Bad, and the particle diameter of the island phase was 50 μm. That is, when the composite material was manufactured, since the islands once separated agglomerated again due to re-heating, the particle diameter becomes greater than that of the island phase produced in <Composite Material Manufacturing Process 1. Manufacturing of Polymer Alloy Component>, and thus the sea-island structure was deteriorated.

<Molded Product Manufacturing (i) (Hot Press Molding)>

A press-molded product was produced through hot pressing in the same manner as in Example 1.

<Molded Product Manufacturing (ii) (Cold Press Molding)>

A press-molded product was produced through cold pressing in the same manner as in Example 1.

Comparative Example 3

<Composite Material Manufacturing Process 1. Manufacturing of Polymer Alloy Component>

A polymer alloy was prepared in the same manner as in Example 5 except that maleic anhydride (Wako Special grade) manufactured by Wako Pure Chemical Industries, Ltd. was used as the compatibilizer. However, a sea-island structure could not be formed (evaluation: Bad). Therefore, the production of a composite material using the polymer alloy was stopped.

Comparative Example 4

<Composite Material Manufacturing Process 1. Manufacturing of Polymer Alloy Component>

Figure 4:
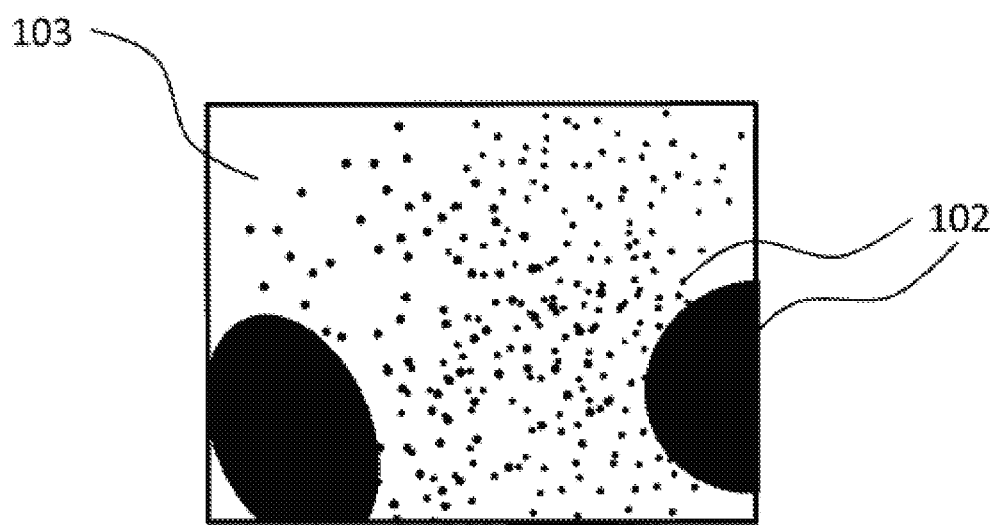
FIG. 4 is a schematic view when a press-molded product of Comparative Example 4 is observed in a cross-section.

A polymer alloy was prepared in the same manner as in Example 10 except that the amount of the compatibilizer (citric acid manufactured by Wako Pure Chemical Industries, Ltd.) added to 100 parts by mass of the polyphenylene ether-based resin was 1 part by mass. However, although a sea-island structure was formed, large islands and fine islands were present, and a clean sea-island structure could not be formed, leading to an increase in the weighted average particle diameter Dr (FIG. 4). Therefore, the production of a composite material using the polymer alloy was stopped.

REFERENCE EXAMPLE

As a reference example, injection molding of only a resin was performed without using carbon fibers, and evaluation of a sea-island structure and an injection pressure and an impact evaluation test were conducted. In addition, in the impact test, the impact strength was evaluated by measuring the Notched Izod impact strength (J/m) with a test piece thickness of 3.2 mm on the basis of ASTM D256.

Reference Example 1

The polyamide 6 resin A1030 manufactured by UNITIKA Ltd. used in Example 1 was injection-molded using an 110 ton electric injection molding machine (J110AD) manufactured by Japan Steel Works at cylinder temperatures of C1/C2/C3/C4/N=280° C./290° C./290° C./290° C./280° C. (C1 to C4 are cavities and N is a nozzle) and a molding cycle of 35 seconds, thereby obtaining a test piece (molded product).

Reference Example 2

A test piece (molded product) was obtained by performing injection molding in the same manner as in Reference Example 1 by using the polymer alloy component produced in Example 1 (the polyamide 6 resin A1030 manufactured by UNITIKA Ltd., the PPO 630 resin manufactured by SABIC, and the citric acid (food additive) manufactured by Wako Pure Chemical Industries, Ltd.) as the compatibilizer.

Reference Example 3

A test piece (molded product) was obtained by performing injection molding in the same manner as in Reference Example 1 by using the polymer alloy component produced in Example 11 (50 parts by mass of the PPE resin and 50 parts by mass of the PS resin with respect to 100 parts by mass of the PA 6 resin were included and the amount of citric acid added to 100 parts by mass of the PPE resin was 3 parts by mass).

As described in Tables 1 to 3 and 6, the content of the polyarylene ether-based resin (Y) in Tables 1 to 3 and 6 is in parts by mass with respect to 100 parts by mass of the polyamide-based resin (X), the content of the thermoplastic resin (Z) is in parts by mass with respect to 100 parts by mass of the polyamide-based resin (X), and the content of the compatibilizer is in parts by mass with respect to 100 parts by mass of the polyarylene ether-based resin (Y).

TABLE 1

| | Example 1 | Example 2 | Example 3 | Example 4 | Example 5 | Example 6 | Example 7 | Example 8 |
|---|---|---|---|---|---|---|---|---|
| Kind of polyamide-based resin (X) | PA 6 resin | PA 6 resin | PA 6 resin | PA 6 resin | PA 6 resin | PA 6 resin | PA 6 resin | PA 6 resin |
| Content (parts by mass) of polyamide-based resin (X) | 100 | 100 | 100 | 100 | 100 | 100 | 100 | 100 |
| Kind of polyarylene ether-based resin (Y) | PPE resin | PPE resin | PPE resin | PPE resin | PPE resin | PPE resin | PPE resin | PPE resin |
| Content of polyarylene ether-based resin (Y) (parts by mass with respect to 100 parts by mass of polyamide-based resin (X)) | 100 | 100 | 33.3 | 100 | 100 | 100 | 99.5 | 90 |
| Kind of thermoplastic resin (Z) | — | — | — | — | — | — | PS resin | PS resin |
| Content of thermoplastic resin (Z) (parts by mass with respect to 100 parts by mass of polyamide-based resin (X)) | 0 | 0 | 0 | 0 | 0 | 0 | 0.5 | 10 |
| Kind of compatibilizer | Citric acid | Maleic anhydride | Citric acid | Citric acid | Citric acid | Maleic anhydride | Citric acid | Citric acid |

TABLE 1-continued

|  | Example 1 | Example 2 | Example 3 | Example 4 | Example 5 | Example 6 | Example 7 | Example 8 |
|---|---|---|---|---|---|---|---|---|
| Content of compatibilizer (parts by mass with respect to 100 parts by mass of polyarylene ether-based resin (Y)) | 1 | 1 | 1 | 2 | 4 | 2 | 1 | 1 |
| Form of polymer alloy | | | | | | | | |
| Sea-island structure | Excellent | Excellent | Excellent | Excellent | Excellent | Great | Excellent | Excellent |
| Particle diameter of island phase μm | 1 | 1 | 0.5 | 1 | 1 | 3 | 1 | 3 |
| Composite material | | | | | | | | |
| Observation of sea-island structure in composite material | | | | | | | | |
| Sea-island structure inside fiber bundle | Excellent | Excellent | Excellent | Excellent | Excellent | Great | Excellent | Excellent |
| Sea-island structure outside fiber bundle | Excellent | Excellent | Excellent | Excellent | Excellent | Great | Excellent | Excellent |
| Particle diameter Dr of island phase (μm) | 1 | 1 | 0.5 | 1 | 1 | 3 | 1 | 3 |
| Thickness of composite material (target value) (mm) | 1.3 | 1.3 | 1.3 | 1.3 | 1.3 | 1.3 | 1.3 | 1.3 |
| Thickness of composite material (actual measurement value) (mm) | 1.16 | 1.16 | 1.20 | 1.15 | 1.17 | 1.17 | 1.16 | 1.26 |
| Fluidity | | | | | | | | |
| Flow distance (mm) | 1.5 | 1.5 | 3.5 | 1.5 | 1.5 | 1.5 | 1.5 | 2.3 |
| Flow distance ÷ Base material thickness | 1.3 | 1.3 | 2.9 | 1.3 | 1.3 | 1.3 | 1.3 | 1.8 |
| Spreadability | | | | | | | | |
| Thickness of press-molded product when two layers of composite material are stacked/Thickness of one layer of composite material | 1.3 | 1.3 | 1.2 | 1.3 | 1.3 | 1.3 | 1.3 | 1.3 |
| Formability | 3 | 3 | 3 | 3 | 3 | 3 | 3 | 4 |
| (Cold) press-molded product | | | | | | | | |
| Observation of sea-island structure | | | | | | | | |
| Sea-island structure inside fiber bundle | Excellent | Excellent | Excellent | Excellent | Excellent | Great | Excellent | Excellent |
| Sea-island structure outside fiber bundle | Excellent | Excellent | Excellent | Excellent | Excellent | Great | Excellent | Excellent |
| Particle diameter Dr of island phase (μm) | 1 | 1 | 0.5 | 1 | 1 | 3 | 1 | 3 |
| Inter-fiber distance in carbon fiber bundle | 0-10 mm | 0-10 mm | 0-10 mm | 0-10 mm | 0-10 mm | 0-10 mm | 0-10 mm | 0-10 mm |
| Rate of decrease in bending strength (%) | 30 | 30 | 47 | 30 | 30 | 33 | 30 | 30 |
| Outer appearance evaluation | 3 | 3 | 2 | 3 | 3 | 3 | 3 | 3 |

TABLE 2

|  | Example 9 | Example 10 | Example 11 | Example 12 | Comparative Example 1 | Comparative Example 2 | Comparative Example 3 | Comparative Example 4 |
|---|---|---|---|---|---|---|---|---|
| Kind of polyamide-based resin (X) | PA 6 resin | PA 6 resin | PA 6 resin | PA 6 resin | PA 6 resin | PA 6 resin | PA 6 resin | PA 6 resin |
| Content (parts by mass) of polyamide-based resin (X) | 100 | 100 | 100 | 100 | 100 | 100 | 100 | 100 |
| Kind of polyarylene ether-based resin (Y) | PPE resin | PPE resin | PPE resin | PPE resin | — | PPE resin | PPE resin | PPE resin |
| Content of polyarylene ether-based resin (Y) (parts by mass with respect to 100 parts by mass of polyamide-based resin (X)) | 70 | 50 | 50 | 150 | — | 100 | 100 | 50 |
| Kind of thermoplastic resin (Z) | PS resin | PS resin | PS resin | — | — | — | — | PS resin |
| Content of thermoplastic resin (Z) (parts by mass with respect to 100 parts by mass of polyamide-based resin (X)) | 30 | 50 | 50 | 0 | 0 | 0 | 0 | 50 |
| Kind of compatibilizer | Citric acid | Citric acid | Citric acid | Maleic anhydride | — | — | Maleic anhydride | Citric acid |
| Content of compatibilizer (parts by mass with respect to 100 parts by mass of polyarylene ether-based resin) | 1 | 2 | 3 | 1 | — | — | 4 | 1 |
| Form of polymer alloy | | | | | | | | |
| Sea-island structure | Great | Great | Excellent | Good | — | Great | Bad | Bad |
| Particle diameter of island phase μm | 8 | 10 | 8 | 10 | — | 15 | Unmeasurable | 20 |
| Composite material | | | | | | | | |
| Observation of sea-island structure in composite material | | | | | | | | |
| Sea-island structure inside fiber bundle | Great | Great | Excellent | Good | — | Bad | Production stopped | Production stopped |
| Sea-island structure outside fiber bundle | Great | Great | Excellent | Good | — | Bad | | |
| Particle diameter Dr of island phase (μm) | 8 | 10 | 8 | 10 | — | 50 | | |
| Thickness of composite material (target value) (mm) | 1.3 | 1.3 | 1.3 | 1.3 | 1.3 | 1.3 | | |
| Thickness of composite material (actual measurement value) (mm) | 1.26 | 1.30 | 1.25 | 1.20 | 1.38 | 1.35 | | |

TABLE 2-continued

|  | Example 9 | Example 10 | Example 11 | Example 12 | Comparative Example 1 | Comparative Example 2 | Comparative Example 3 | Comparative Example 4 |
|---|---|---|---|---|---|---|---|---|
| Fluidity |  |  |  |  |  |  |  |  |
| Flow distance (mm) | 9.0 | 16.8 | 17.0 | 0.5 | 20.5 | 1 |  |  |
| Flow distance ÷ Base material thickness | 7.1 | 12.9 | 13.6 | 0.4 | 14.9 | 0.74 |  |  |
| Spreadability |  |  |  |  |  |  |  |  |
| Thickness of press-molded product when two layers of composite material are stacked/Thickness of one layer of composite material | 1.3 | 1.2 | 1.2 | 1.5 | 1.3 | 1.5 |  |  |
| Formability | 4 | 5 | 5 | 2 | 2 | 1 |  |  |
| (Cold) press-molded product |  |  |  |  |  |  |  |  |
| Observation of sea-island structure |  |  |  |  |  |  |  |  |
| Sea-island structure inside fiber bundle | Great | Great | Excellent | Good | — | Bad | Production stopped | Production stopped |
| Sea-island structure outside fiber bundle | Great | Great | Excellent | Good | — | Bad |  |  |
| Particle diameter Dr of island phase (μm) | 8 | 10 | 8 | 10 | — | 80 |  |  |
| Inter-fiber distance in carbon fiber bundle | 0-10 mm | 0-10 mm | 0-10 mm | 0-10 mm | 0-10 mm | 0-10 mm |  |  |
| Rate of decrease in bending strength (%) | 33 | 30 | 30 | 25 | 50 | 45 |  |  |
| Outer appearance evaluation | 3 | 3 | 3 | 4 | 1 | 3 |  |  |

TABLE 3

|  | Example 13 |
|---|---|
| Kind of polyamide-based resin (X) | PA 66 resin |
| Content (parts by mass) of polyamide-based resin (X) | 100 |
| Kind of polyarylene ether-based resin (Y) | PPE resin |
| Content of polyarylene ether-based resin (Y) (parts by mass with respect to 100 parts by mass of polyamide-based resin (X)) | 50 |
| Kind of thermoplastic resin (Z) | PS resin |
| Content of thermoplastic resin (Z) (parts by mass with respect to 100 parts by mass of polyamide-based resin (X)) | 50 |
| Kind of compatibilizer | Citric acid |
| Content of compatibilizer (parts by mass with respect to 100 parts by mass of polyarylene ether-based resin (Y)) | 3 |
| Form of polymer alloy |  |
| Sea-island structure | Excellent |
| Particle diameter of island phase μm | 3 |
| Composite material |  |
| Observation of sea-island structure in composite material |  |
| Sea-island structure inside fiber bundle | Excellent |
| Sea-island structure outside fiber bundle | Excellent |
| Particle diameter Dr of island phase (μm) | 3 |
| Thickness of composite material (target value) (mm) | 1.3 |
| Thickness of composite material (actual measurement value) (mm) | 1.31 |
| Spreadability |  |
| Thickness of press-molded product when two layers of composite material are stacked/Thickness of one layer of composite material | 1.2 |
| Formability | 5 |
| (Cold) press-molded product |  |
| Observation of sea-island structure |  |
| Sea-island structure inside fiber bundle | Excellent |
| Sea-island structure outside fiber bundle | Excellent |
| Particle diameter Dr of island phase (μm) | 3 |
| Inter-fiber distance in carbon fiber bundle | 0-10 mm |
| Rate of decrease in bending strength (%) | 24 |
| Outer appearance evaluation | 4 |

TABLE 4

| Impact test | Example 2 | Example 9 | Example 11 | Comparative Example 1 |
|---|---|---|---|---|
| Molded product impact energy (J) | 32.1 | 31.6 | 32.5 | 31 |

TABLE 5

| Viscosity | Example 8 | Example 9 | Example 10 | Example 11 | Comparative Example 1 |
|---|---|---|---|---|---|
| Viscosity η at 230° C. in dynamic viscoelasticity measurement at rate of temperature decrease of 5° C./min, 270° C. to 200° C., and 10 rad/sec | 30500 | 30120 | 29900 | 29200 | 27200 |

TABLE 6

|  | Reference Example 1 | Reference Example 2 | Reference Example 3 |
|---|---|---|---|
| Kind of polyamide-based resin (X) | PA 6 resin | PA 6 resin | PA 6 resin |
| Content (parts by mass) of polyamide-based resin (X) | 100 | 100 | 100 |
| Kind of polyarylene ether-based resin (Y) | — | PPE resin | PPE resin |
| Content of polyarylene ether-based resin (Y) (parts by mass with respect to 100 parts by mass of polyamide-based resin (X)) | 0 | 100 | 50 |
| Kind of thermoplastic resin (Z) | — | — | PS resin |
| Content of thermoplastic resin (Z) (parts by mass with respect to 100 parts by mass of polyamide-based resin (X)) | 0 | 0 | 50 |
| Kind of compatibilizer | — | Citric acid | Citric acid |
| Content of compatibilizer (parts by mass with respect to 100 parts by mass of polyarylene ether-based resin (Y)) | — | 1 | 3 |

TABLE 6-continued

|  | Reference Example 1 | Reference Example 2 | Reference Example 3 |
|---|---|---|---|
| Form of polymer alloy | | | |
| Sea-island structure | — | Excellent | Excellent |
| Particle diameter of island phase (μm) | — | 1 | 8 |
| Injection pressure (MPa) | 68 | 127 | 127 |
| Molded product Impact test | | | |
| Izod impact strength (J/m) | 50 | 30 | 28 |

INDUSTRIAL APPLICABILITY

The molded product of the present invention can be used for various constituent members such as inner plates, outer plates, and structural members of automobiles, various electric products, frames and housings of machines, and the like. The molded product can be preferably used as an automobile component.

Although the present invention has been described in detail with reference to specific embodiments, it should be noted by those skilled in the art that various changes and modifications can be made without departing from the spirit and scope of the present invention.

This application is based on Japanese Patent Application (Japanese Patent Application No. 2015-193694), filed on Sep. 30, 2015, the content of which is incorporated herein by reference.

REFERENCE SIGNS LIST 101 carbon fiber bundle
102 island phase
103 sea phase
104 single fiber of carbon fiber
301 iron ball
302 composite material
303 cylinder
401 large island phase

The invention claimed is:

1. A press-molded product comprising:
carbon fibers having a weight average fiber length of 1 mm or more;
a polyamide-based resin (X); and
a polyarylene ether-based resin (Y),
wherein the carbon fibers include carbon fiber bundles, and
the polyamide-based resin (X) and the polyarylene ether-based resin (Y) form a sea-island structure inside and outside the carbon fiber bundles in which one of the polyamide-based resin (X) and the polyarylene ether-based resin (Y) forms a sea phase and the other forms an island phase having a particle diameter Dr of 0.05 μm or more and less than 50 μ;
wherein the carbon fiber bundle includes at least a critical number of single fibers as defined in expression (1):

$$\text{critical number of single fibers} = 600/Df \quad (1),$$

wherein Df is an average fiber diameter (μm) of the carbon fibers; and
wherein an average number (N) of fibers in the carbon fiber bundles (A) satisfies the following formula (2):

$$6\times10^3/Df^2 < N < 6\times10^5/Df^2 \quad (2).$$

2. The press-molded product according to claim 1, wherein the polyamide-based resin (X) forms the sea phase and the polyarylene ether-based resin (Y) forms the island phase.

3. The press-molded product according to claim 1, wherein, with respect to 100 parts by mass of the polyamide-based resin (X), 20 parts by mass or more and 300 parts by mass or less of the polyarylene ether-based resin (Y) is contained.

4. The press-molded product according to claim 1, wherein, with respect to 100 parts by mass of the polyarylene ether-based resin (Y), 0.05 parts by mass or more and 10 parts by mass or less of a compatibilizer is contained.

5. The press-molded product according to claim 1, further including: a thermoplastic resin (Z), in which a viscosity η at 230° C. in dynamic viscoelasticity measurement at a rate of temperature decrease of 5° C./min, 270° C. to 200° C., and 10 rad/sec is 10,000 to 60,000 Pa·sec.

6. The press-molded product according to claim 5, wherein the viscosity η of claim 5 is 0.6 $\eta_x$ or more and 1.4 $\eta_x$ or less,
wherein $\eta_x$ represents a viscosity value of the press-molded product generated by replacing the polyarylene ether-based resin (Y) and the thermoplastic resin (Z) with the polyamide-based resin (X).

7. The press-molded product according to claim 5, comprising:
20 parts by mass or more and 300 parts by mass or less of the polyarylene ether-based resin (Y); and
1 part by mass or more and 300 parts by mass or less of the thermoplastic resin (Z),
with respect to 100 parts by mass of the polyamide-based resin (X).

8. The press-molded product according to claim 5, wherein the thermoplastic resin (Z) is a polystyrene-based resin.

9. The press-molded product according to claim 5, wherein the thermoplastic resin (Z) and the polyarylene ether-based resin (Y) form a mixed phase.

10. The press-molded product according to claim 1, wherein the carbon fibers have volume fraction of 3 vol % or more and 60 vol % or less.

11. The press-molded product according to claim 1, wherein the carbon fibers are randomly dispersed in two-dimensions in an in-plane direction, and
a ratio obtained by dividing a larger one of values of tensile moduli respectively measured in an arbitrary direction of the molded product and the direction orthogonal to the arbitrary direction by the smaller one of the values is 2 or less.

12. The press-molded product according to claim 1, wherein a distance L between carbon fiber single fibers which is shorter than the particle diameter Dr of the island phase is present inside the carbon fiber bundle in a cross-section view of the press-molded product.

13. The press-molded product according to claim 12, wherein at least one island phase is in contact with the carbon fibers inside the carbon fiber bundle.

14. A composite material comprising:
carbon fibers having a weight average fiber length of 1 mm or more;
a polyamide-based resin (X); and
a polyarylene ether-based resin (Y),
wherein the carbon fibers include carbon fiber bundles,
the polyamide-based resin (X) and the polyarylene ether-based resin (Y) form a sea-island structure inside and outside the carbon fiber bundles in which one of the polyamide-based resin (X) and the polyarylene ether-based resin (Y) forms a sea phase and the other forms an island phase having a particle diameter Dr of 0.05 μm or more and less than 50 μm;

wherein the carbon fiber bundle includes at least a critical number of single fibers defined in expression (1):

$$\text{critical number of single fibers} = 600/Df \quad (1)$$

wherein Df is an average fiber diameter (μm) of the carbon fibers; and wherein an average number (N) of fibers in the carbon fiber bundles (A) satisfies the following formula (2):

$$6 \times 10^3/Df^2 < N < 6 \times 10^5/Df^2 \quad (2).$$

15. The composite material according to claim 14, wherein the polyamide-based resin (X) forms the sea phase and the polyarylene ether-based resin (Y) forms the island phase.

16. The composite material according to claim 14, comprising 20 parts by mass or more and 300 parts by mass or less of the polyarylene ether-based resin (Y) with respect to 100 parts by mass of the polyamide-based resin (X).

17. The composite material according to claim 14, further comprising:

0.05 parts by mass or more and 10 parts by mass or less of a compatibilizer with respect to 100 parts by mass of the polyarylene ether-based resin (Y).

18. The composite material according to claim 14, further comprising: a thermoplastic resin (Z), wherein the composite material has a viscosity η at 230° C. in dynamic viscoelasticity measurement at a rate of temperature decrease of 5° C./min, decreasing from 270° C. to 200° C., and 10 rad/sec is 10,000 to 60,000 Pa·sec.

19. The composite material according to claim 18, wherein the viscosity η of claim 18 is 0.6 $\eta_x$ or more and 1.4 $\eta_x$ or less, wherein $\eta_x$ represents a viscosity value of a composite material generated by replacing the polyarylene ether-based resin (Y) and the thermoplastic resin (Z) with the polyamide-based resin (X).

20. The composite material according to claim 18, comprising:

20 parts by mass or more and 300 parts by mass or less of the polyarylene ether-based resin (Y); and 1 part by mass or more and 300 parts by mass or less of the thermoplastic resin (Z), with respect to 100 parts by mass of the polyamide-based resin (X).

21. The composite material according to claim 18, wherein the thermoplastic resin (Z) is a polystyrene-based resin.

22. The composite material according to claim 18, wherein the thermoplastic resin (Z) and the polyarylene ether-based resin (Y) form a mixed phase.

23. The composite material according to claim 14, wherein the carbon fibers have a volume fraction of 3 vol % or more and 60 vol % or less.

24. The composite material according to claim 14, wherein a distance L between carbon fiber single fibers which is shorter than the particle diameter Dr of the island phase is present inside the carbon fiber bundle in a cross-section view of the composite material.

25. The composite material according to claim 14, wherein at least one island phase is in contact with the carbon fibers inside the carbon fiber bundle.

26. The press-molded product according to claim 1, wherein the weight average fiber length of the carbon fibers is 3 mm or more and 80 mm or less.

27. The press-molded product according to claim 1, wherein the proportion of the carbon fiber bundles (A) with respect to the total amount of the carbon fibers in the molded product is 20% by volume or more.

28. The press-molded product according to claim 1, wherein the weight average fiber length of the carbon fibers is 1 mm or more and 100 mm or less.

29. The press-molded product according to claim 1, wherein the weight average fiber length of the carbon fibers is 5 mm or more and 60 mm or less.

\* \* \* \* \*